United States Patent
Takayama

(10) Patent No.: US 8,395,582 B2
(45) Date of Patent: Mar. 12, 2013

(54) COMPUTER-READABLE STORAGE MEDIUM AND INFORMATION PROCESSING APPARATUS

(75) Inventor: Takahiro Takayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 722 days.

(21) Appl. No.: 12/561,541

(22) Filed: Sep. 17, 2009

(65) Prior Publication Data

US 2010/0245236 A1    Sep. 30, 2010

(30) Foreign Application Priority Data

Mar. 30, 2009 (JP) ................................. 2009-083305

(51) Int. Cl.
*G06F 3/033* (2006.01)

(52) U.S. Cl. .......................... 345/156; 345/158; 345/178

(58) Field of Classification Search ......................... None
See application file for complete search history.

(56) References Cited

U.S. PATENT DOCUMENTS

| 588,172 | A | 8/1897 | Peters |
| 688,076 | A | 12/1901 | Ensign |
| D188,376 | S | 7/1960 | Hotkins et al. |
| 3,184,962 | A | 5/1965 | Gay |
| 3,217,536 | A | 11/1965 | Motsinger et al. |
| 3,424,005 | A | 1/1969 | Brown |
| 3,428,312 | A | 2/1969 | Machen |
| 3,712,294 | A | 1/1973 | Muller |
| 3,752,144 | A | 8/1973 | Weigle, Jr. |
| 3,780,817 | A | 12/1973 | Videon |
| 3,826,145 | A | 7/1974 | McFarland |
| 3,869,007 | A | 3/1975 | Haggstrom et al. |
| 4,058,178 | A | 11/1977 | Shinohara et al. |
| 4,104,119 | A | 8/1978 | Schilling |
| 4,136,682 | A | 1/1979 | Pedotti |
| 4,246,783 | A | 1/1981 | Steven et al. |

(Continued)

FOREIGN PATENT DOCUMENTS

| DE | 40 04 554 | 8/1991 |
| DE | 195 02 918 | 8/1996 |

(Continued)

OTHER PUBLICATIONS

Search Report (2 pgs.) dated May 27, 2011 issued in German Application No. 20 2004 021 793.7.

(Continued)

*Primary Examiner* — Muhammad N Edun
(74) *Attorney, Agent, or Firm* — Nixon & Vanderhye P.C.

(57) ABSTRACT

When a gravity center position enters a right input area, a motion of a character in a virtual game space pushing down the right pedal of a bicycle is started, and the bicycle is accelerated. Further, a reference position is moved so as to gradually approach the gravity center position, and the boundary between a non-input area and a left input area is also moved so as to gradually approach the gravity center position in conjunction with the reference position. When the gravity center position enters the left input area, a motion of the character in the virtual game space pushing down the left pedal of the bicycle is started, and the bicycle is accelerated. Further, the reference position is moved so as to gradually approach the gravity center position, and the boundary between the non-input area and the right input area is also moved so as to gradually approach the gravity center position in conjunction with the reference position.

20 Claims, 25 Drawing Sheets

U.S. PATENT DOCUMENTS

| | | | |
|---|---|---|---|
| 4,296,931 A | 10/1981 | Yokoi | |
| 4,337,050 A | 6/1982 | Engalitcheff, Jr. | |
| 4,404,854 A | 9/1983 | Krempl et al. | |
| 4,488,017 A | 12/1984 | Lee | |
| 4,494,754 A | 1/1985 | Wagner, Jr. | |
| 4,558,757 A | 12/1985 | Mori et al. | |
| 4,569,519 A | 2/1986 | Mattox et al. | |
| 4,574,899 A | 3/1986 | Griffin | |
| 4,577,868 A | 3/1986 | Kiyonaga | |
| 4,598,717 A | 7/1986 | Pedotti | |
| 4,607,841 A | 8/1986 | Gala | |
| 4,630,817 A | 12/1986 | Buckleu | |
| 4,660,828 A | 4/1987 | Weiss | |
| 4,680,577 A | 7/1987 | Straayer et al. | |
| 4,688,444 A | 8/1987 | Nordstrom | |
| 4,691,694 A | 9/1987 | Boyd et al. | |
| 4,711,447 A | 12/1987 | Mansfield | |
| 4,726,435 A | 2/1988 | Kitagawa et al. | |
| 4,739,848 A | 4/1988 | Tulloch | |
| 4,742,832 A | 5/1988 | Kauffmann et al. | |
| 4,742,932 A | 5/1988 | Pedragosa | |
| 4,800,973 A | 1/1989 | Angel | |
| 4,838,173 A | 6/1989 | Schroeder et al. | |
| 4,855,704 A | 8/1989 | Betz | |
| 4,880,069 A | 11/1989 | Bradley | |
| 4,882,677 A | 11/1989 | Curran | |
| 4,893,514 A | 1/1990 | Gronert et al. | |
| 4,907,797 A | 3/1990 | Gezari et al. | |
| 4,927,138 A | 5/1990 | Ferrari | |
| 4,970,486 A | 11/1990 | Gray et al. | |
| 4,982,613 A | 1/1991 | Becker | |
| D318,073 S | 7/1991 | Jang | |
| 5,044,956 A | 9/1991 | Behensky et al. | |
| 5,049,079 A | 9/1991 | Furtado et al. | |
| 5,052,406 A | 10/1991 | Nashner | |
| 5,054,771 A | 10/1991 | Mansfield | |
| 5,065,631 A | 11/1991 | Ashpitel et al. | |
| 5,089,960 A | 2/1992 | Sweeney, Jr. | |
| 5,103,207 A | 4/1992 | Kerr et al. | |
| 5,104,119 A | 4/1992 | Lynch | |
| 5,116,296 A | 5/1992 | Watkins et al. | |
| 5,118,112 A | 6/1992 | Bregman et al. | |
| 5,151,071 A | 9/1992 | Jain et al. | |
| 5,195,746 A | 3/1993 | Boyd et al. | |
| 5,197,003 A | 3/1993 | Moncrief et al. | |
| 5,199,875 A | 4/1993 | Trumbull | |
| 5,203,563 A | 4/1993 | Loper, III | |
| 5,207,426 A | 5/1993 | Inoue et al. | |
| 5,259,252 A | 11/1993 | Kruse et al. | |
| 5,269,318 A | 12/1993 | Nashner | |
| 5,299,810 A | 4/1994 | Pierce et al. | |
| 5,303,715 A | 4/1994 | Nashner et al. | |
| 5,360,383 A | 11/1994 | Boren | |
| 5,362,298 A | 11/1994 | Brown et al. | |
| 5,368,546 A | 11/1994 | Stark et al. | |
| 5,405,152 A | 4/1995 | Katanics et al. | |
| 5,431,569 A | 7/1995 | Simpkins et al. | |
| 5,462,503 A | 10/1995 | Benjamin et al. | |
| 5,466,200 A | 11/1995 | Ulrich et al. | |
| 5,469,740 A | 11/1995 | French et al. | |
| 5,474,087 A | 12/1995 | Nashner | |
| 5,476,103 A | 12/1995 | Nahsner | |
| 5,507,708 A | 4/1996 | Ma | |
| 5,541,621 A | 7/1996 | Nmngani | |
| 5,541,622 A | 7/1996 | Engle et al. | |
| 5,547,439 A | 8/1996 | Rawls et al. | |
| 5,551,445 A | 9/1996 | Nashner | |
| 5,551,693 A | 9/1996 | Goto et al. | |
| 5,577,981 A | 11/1996 | Jarvik | |
| D376,826 S | 12/1996 | Ashida | |
| 5,584,700 A | 12/1996 | Feldman et al. | |
| 5,584,779 A | 12/1996 | Knecht et al. | |
| 5,591,104 A | 1/1997 | Andrus et al. | |
| 5,613,690 A | 3/1997 | McShane et al. | |
| 5,623,944 A | 4/1997 | Nashner | |
| 5,627,327 A | 5/1997 | Zanakis | |
| D384,115 S | 9/1997 | Wilkinson et al. | |
| 5,669,773 A | 9/1997 | Gluck | |
| 5,689,285 A | 11/1997 | Asher | |
| 5,690,582 A | 11/1997 | Ulrich et al. | |
| 5,697,791 A | 12/1997 | Nashner et al. | |
| 5,713,794 A | 2/1998 | Shimojima et al. | |
| 5,721,566 A | 2/1998 | Rosenberg et al. | |
| 5,746,684 A | 5/1998 | Jordan | |
| 5,785,630 A | 7/1998 | Bobick et al. | |
| D397,164 S | 8/1998 | Goto | |
| 5,788,618 A | 8/1998 | Joutras | |
| 5,792,031 A | 8/1998 | Alton | |
| 5,800,314 A | 9/1998 | Sakakibara et al. | |
| 5,805,138 A | 9/1998 | Brawne et al. | |
| 5,813,958 A | 9/1998 | Tomita | |
| 5,814,740 A | 9/1998 | Cook et al. | |
| 5,820,462 A | 10/1998 | Yokoi et al. | |
| 5,825,308 A | 10/1998 | Rosenberg | |
| 5,837,952 A | 11/1998 | Oshiro et al. | |
| D402,317 S | 12/1998 | Goto | |
| 5,846,086 A | 12/1998 | Bizzi et al. | |
| 5,853,326 A | 12/1998 | Goto et al. | |
| 5,854,622 A | 12/1998 | Brannon | |
| 5,860,861 A | 1/1999 | Lipps et al. | |
| 5,864,333 A | 1/1999 | O'Heir | |
| 5,872,438 A | 2/1999 | Roston | |
| 5,886,302 A | 3/1999 | Germanton et al. | |
| 5,888,172 A | 3/1999 | Andrus et al. | |
| 5,889,507 A | 3/1999 | Engle et al. | |
| D407,758 S | 4/1999 | Isetani et al. | |
| 5,890,995 A | 4/1999 | Bobick et al. | |
| 5,897,457 A | 4/1999 | Mackovjak | |
| 5,897,469 A | 4/1999 | Yalch | |
| 5,901,612 A | 5/1999 | Letovsky | |
| 5,902,214 A | 5/1999 | Makikawa et al. | |
| 5,904,639 A | 5/1999 | Smyser et al. | |
| D411,258 S | 6/1999 | Isetani et al. | |
| 5,912,659 A | 6/1999 | Rutledge et al. | |
| 5,919,092 A | 7/1999 | Yokoi et al. | |
| 5,921,780 A | 7/1999 | Myers | |
| 5,921,899 A | 7/1999 | Rose | |
| 5,929,782 A | 7/1999 | Stark et al. | |
| 5,947,824 A | 9/1999 | Minami et al. | |
| 5,976,063 A | 11/1999 | Joutras et al. | |
| 5,980,256 A | 11/1999 | Carmein | |
| 5,980,429 A | 11/1999 | Nashner | |
| 5,984,785 A | 11/1999 | Takeda et al. | |
| 5,987,982 A | 11/1999 | Wenman et al. | |
| 5,989,157 A | 11/1999 | Walton | |
| 5,993,356 A | 11/1999 | Houston et al. | |
| 5,997,439 A | 12/1999 | Ohsuga et al. | |
| 6,001,015 A | 12/1999 | Nishiumi et al. | |
| 6,007,428 A | 12/1999 | Nishiumi et al. | |
| 6,010,465 A | 1/2000 | Nashner | |
| D421,070 S | 2/2000 | Jang et al. | |
| 6,037,927 A | 3/2000 | Rosenberg | |
| 6,038,488 A | 3/2000 | Barnes et al. | |
| 6,044,772 A | 4/2000 | Gaudette et al. | |
| 6,052,114 A * | 4/2000 | Morifuji | 345/158 |
| 6,063,046 A | 5/2000 | Allum | |
| 6,086,518 A | 7/2000 | MacCready, Jr. | |
| 6,102,803 A | 8/2000 | Takeda et al. | |
| 6,102,832 A | 8/2000 | Tani | |
| D431,051 S | 9/2000 | Goto | |
| 6,113,237 A | 9/2000 | Ober et al. | |
| 6,147,674 A | 11/2000 | Rosenberg et al. | |
| 6,152,564 A | 11/2000 | Ober et al. | |
| D434,769 S | 12/2000 | Goto | |
| D434,770 S | 12/2000 | Goto | |
| 6,155,926 A | 12/2000 | Miyamoto et al. | |
| 6,162,189 A | 12/2000 | Girone et al. | |
| 6,167,299 A | 12/2000 | Galchenkov et al. | |
| 6,190,287 B1 | 2/2001 | Nashner | |
| 6,200,253 B1 | 3/2001 | Nishiumi et al. | |
| 6,203,432 B1 | 3/2001 | Roberts et al. | |
| 6,216,542 B1 | 4/2001 | Stockli et al. | |
| 6,216,547 B1 | 4/2001 | Lehtovaara | |
| 6,220,865 B1 | 4/2001 | Macri et al. | |
| D441,369 S | 5/2001 | Goto | |
| 6,225,977 B1 | 5/2001 | Li | |
| 6,227,968 B1 | 5/2001 | Suzuki et al. | |

| | | |
|---|---|---|
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 * | 9/2003 | Klein et al. ............. 345/156 |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | LaVelle |
| RE40,427 E | 7/2008 | Nashner |
| 7,416,537 B1 | 8/2008 | Stark et al. |
| 7,530,929 B2 | 5/2009 | Feldman et al. |
| 7,722,501 B2 | 5/2010 | Nicolas et al. |
| 7,811,217 B2 * | 10/2010 | Odien ............. 482/147 |
| 7,938,751 B2 | 5/2011 | Nicolas et al. |
| 2001/0001303 A1 | 5/2001 | Ohsuga et al. |
| 2001/0018363 A1 | 8/2001 | Goto et al. |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |
| 2008/0012826 A1 | 1/2008 | Cunningham et al. |
| 2008/0080005 A1 * | 4/2008 | Takematsu ............. 358/1.17 |
| 2008/0228110 A1 | 9/2008 | Berme |
| 2008/0242515 A1 * | 10/2008 | Odien ............. 482/34 |
| 2008/0261696 A1 | 10/2008 | Yamazaki et al. |
| 2009/0093315 A1 | 4/2009 | Matsunaga et al. |

FOREIGN PATENT DOCUMENTS

| | | |
|---|---|---|
| DE | 297 12 785 | 1/1998 |
| DE | 20 2004 021 792 U1 | 5/2011 |
| DE | 20 2004 021 793 U1 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |
| EP | 1 870 141 | 12/2007 |
| FR | 2 472 929 | 7/1981 |
| FR | 2 587 611 | 3/1987 |

| | | |
|---|---|---|
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-034016 | 2/1987 |
| JP | 62-34016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 8-182774 | 7/1996 |
| JP | 08-182774 | 7/1996 |
| JP | 8-184474 | 7/1996 |
| JP | 08-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/099582 | 8/2008 |

OTHER PUBLICATIONS

Interface, Inc.—Advanced Force Measurement—SM Calibration Certificate Installation Information, 1984.

Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.

Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.

D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.

Ludonauts, "Body Movin'," May 24, 2004, http://web.archive.org/web/20040611131903/http:/www.ludonauts.com; retrieved Aug. 31, 2010, 4 pages.

Atari Gaming Headquarters—AGH's Atari Project Puffer Page, http://www.atarihq.com/othersec/puffer/index.html, retrieved Sep. 19, 2002, 4 pages.

Michael Antonoff, "Real estate is cheap here, but the places you'd most want to visit are still under construction," Popular Science, Jun. 1993, pp. 33-34.

Steve Aukstakalnis and David Blatner, "The Art and Science of Virtual Reality—Silicon Mirage," 1992, pp. 197-207.

Electronics, edited by Michael Antonoff, "Video Games—Virtual Violence: Boxing Without Bruises," Popular Science, Apr. 1993, p. 60.

Stuart F. Brown, "Video cycle race," Popular Science, May 1989, p. 73.

Scanning the Field for Ideas, "Chair puts Player on the Joystick," Machine Design, No. 21, Oct. 24, 1991, XP 000255214, 1 page.

Francis Hamit, "Virtual Reality and the Exploration of Cyberspace," University of MD Baltimore County, 1993, 4 pages.

Ric Manning, "Videogame players get a workout with the Exertainment," The Gizmo Page from the Courier Journal Sep. 25, 1994, 1 page.

Tech Lines, Military—Arcade aces and Aviation—Winging it, Popular Mechanics, Mar. 1982, p. 163.

Sarju Shah, "Mad Catz Universal MC2 Racing Wheel: Mad Catz MC2 Universal," Game Spot, posted Feb. 18, 2005, 3 pages.

Joe Skorupa, "Virtual Fitness," Sports Science, Popular Mechanics, Oct. 1994, 3 pages.

Nintendo Zone—The History of Nintendo (1889-1997), retrieved Aug. 24, 1998 pp. 1, 9-10.

The Legible City, Computergraphic Installation with Dirk Groeneveld, Manhattan version (1989), Amsterdam version (1990), Karlsruhe version (1991), 3 pages.

The New Exertainment System. It's All About Giving Your Members Personal Choices, Life Fitness, Circle Reader Service Card No. 28, 1995, 1 page.

The Race Begins with $85, Randal Windracer, Circle Reader Service Card No. 34, 1990, 1 page.

Universal S-Video/Audio Cable; Product #5015, MSRP 9.99; http://www.madcatz.com/Default.asp?Page=133&CategoryImg=Universal_Cables, retrieved May 12, 2005, 1 page.

Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.

Raymond W. McGorry, "A system for the measurement of grip forces and applied moments during hand tool use," Liberty Mutual Research Center for Safety and Health, Applied Ergonomics 32 (2001) 271-279.

NordicTrack's Aerobic Cross Trainer advertisment as shown in "Big Ideas—For a Little Money: Great Places to Invest $1,000 or Less," Kiplinger's Personal Finance Magazine, Jul. 1994, 3 pages.
Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.
Leigh Ann Roman, "Boing! Combines Arcade Fun with Physical Training," Memphis—Health Care News: Monitoring the Pulse of Our Health Care Community, Sep. 20, 1996, One Section, 1 page.
"No More Couch Potato Kids," as shown in Orange Coast, Sep. 1994, p. 16.
Gary L. Downey, et al., "Design of an Exercise Arcade for Children with Disabilities," Resna, Jun. 26-30, 1998, pp. 405-407.
Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.
Carolyn Cosmos, "An 'Out of Wheelchair Experience'", The Washington Post, May 2, 2000, 3 pages.
David H. Ahl, "Controller update," Creative Computing, vol. 9, No. 12, Dec. 1983, p. 142.
Ian Bogost, "Water Cooler Games—The Prehistory of Wii Fit," Videogame Theory, Criticism, Design, Jul. 15, 2007, 2 pages.
Jeremy Reimer, "A history of the Amiga, part 2: The birth of Amiga," last updated Aug. 12, 2007, 2 pages.
The Amiga Joyboard (1982) image, Photos: Fun with plastic—peripherals that changed gaming; http://news.cnet.com/2300-27076_3-10001507-2.html (retrieved Jul. 23, 2010), 1 page.
The Amiga Power System Joyboard, Amiga history guide, http://www.amigahistory.co.uk/joyboard.html (retrieved Jul. 23, 2010), 2 pages.
"Joyboard," Wikipedia—the free encyclopedia, http://en.wikipedia.org/wiki/Joyboard (retrieved Jul. 26, 2010), 2 pages.
"Dance Dance Revolution," Wikipedia—the free encyclopedia, http://en.wikipedia.org/wiki/Dance Dance Revolution (retrieved Jul. 23, 2010), 9 pages.
"Cure for the couch potato," Kansas City Star (MO), Jan. 2, 2005, WLNR 22811884, 1 page.
JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.
"Power Pad/Family Fun and Fitness/Family Trainer," http://www.gamersgraveyard.com/repository/nes/peripherals/powerpad.html (retrieved Jul. 26, 2010), 2 pages.
"Power Pad Information," Version 1.0 (Sep. 23, 1999) http://www.gamersgraveyard.com/repository/nes/peripherals/powerpad.txt (retrieved Jul. 26, 2010), 2 pages.
Wii+Power+Pad.jpg (image), http://bp1.blogger.com/_J5LEiGp54I/RpZbNpnLDgl/AAAAAAAAAic/Gum6DD3Umjg/s1600-h/Wii+Power+Pad.jpg (retrieved Jul. 26, 2010), 1 page.
Vs. Slalom—Videogame by Nintendo, KLOV—Killer List of Video Games, http://www.arcade-museum.com/game_detail.php?game_id=10368 (retrieved Jul. 26, 2010), 3 pages.
"Nintendo Vs. System," Wikipedia—the free encyclopedia, http://en.wikipedia.org/wiki/Nintendo_Vs._System (retrieved Jul. 26, 2010), 3 pages.
HyperspaceArcade.com—Specialists in Arcade Video Game Repair and Restoration, http://www.hyperspacearcade.com/VSTypes.html (retrieved Jul. 3, 2010), 3 pages.
Vs. Slalom—Attachment Pak Manual; for Installation in: VS. UniSystem (UPRIGHT) and VS. DualSystem (UPRIGHT), TM of Nintendo of America Inc., 1986, 15 pages.
Leiterman, "Project Puffer: Jungle River Cruise," Atari, Inc., 1982, 2 pages.
Leiterman, "Project Puffer: Tumbleweeds," Atari, Inc., 1982, 1 page.
Trevor Meers, "Virtually There: VR Entertainment Transports Players to Entrancing New Worlds," Smart Computing, vol. 4, Issue 11, Nov. 1993, 6 pages.
"Dance Aerobics," Moby Games, Feb. 12, 2008, 2 pages.
Electronic Entertainment Expo (E3) Overview, Giant Bomb—E3 2004 (video game concept), http://www.giantbomb.com/e3-2004/92/3436/ (retrieved Sep. 3, 2010), 3 pages.

Fitness article, Sep. 1994, p. 402-404.
"Wired Top 10: Best Selling Toys in Jun. 1994," Wired Sep. 1994, 1 page.
Complaint for Patent Infringement, *IA Labs CA, LLC* v. *Nintendo Co., Ltd. and Nintendo of America, Inc.*, United States District Court for the District of Maryland Northern Division (Apr. 2, 2010), 317 pages.
Plaintiff IA Labs CA, LLC's Opening Claim Construction Brief, *IA Labs CA, LLC* v. *Nintendo Co., Ltd.* and *Nintendo of American, Inc.*, United States District Court for the District of Maryland Southern Division (Dec. 13, 2010), 36 pages.
Nintendo Co., Ltd. and Nintendo of America Inc.'s Opening Claim Construction Brief, *IA Labs CA, LLC* v. *Nintendo Co., Ltd. and Nintendo of American, Inc.*, United States District Court for the District of Maryland Southern Division (Dec. 13, 2010), 55 pages.
Plaintiff IA Labs CA, LLC's Response Claim Construction Brief, *IA Labs CA, LLC* v. *Nintendo Co., Ltd. and Nintendo of American, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs CA, LLC* v. *Nintendo Co., Ltd. and Nintendo of America, Inc.*, United States District Court for the District of Maryland Souther Division (Jan. 6, 2011), 25 pages.
Expert Report of Lee Rawls, Nov. 2, 2010, 37 pages (redacted).
Nintendo Co., Ltd. and Nintendo of America'S Opposition to IA Labs CA, LLC'S Motion for Partial Summary Judgment, *IA Labs CA, LLC,* (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.
Declaration of R. Lee Rawls in Support of Nintendo Co., Ltd. and Nintendo of America Inc.'s Opposition to IA Labs CA. LLC's Motion for Partial Summary Judgment, *IA Labs CA, LLC,* (Plaintiff) v. *Nintendo Co., Ltd. et al.*, (Defendant), United States District Court for the District of Maryland Southern Division (May 16, 2011), including Exhibits 1, 3-12, 193 pages.
Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC,* (Plaintiff) v. *Nintendo Co., Ltd. et al.*, (Defendant), United States District Court for the District of Maryland Souther Division (May 16, 2011), 7 pages.
Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC,* (Plaintiff) v. *Nintendo Co., Ltd. et al.*, (Defendant), United States District Court for the District of Maryland Souther Division (May 16, 2011), Appendix of Exhibits, 2 pages.
Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC,* (Plaintiff) v. *Nintendo Co., Ltd. et al.*, (Defendant), United States District Court for the District of Maryland Southern Division (May 16, 2011), Exhibit 1, 36 pages.
Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC,* (Plaintiff) v. *Nintendo Co., Ltd. et al.*, (Defendant), United States District Court for the District of Maryland Southern Division (May 16, 2011), Exhibit 2, 40 pages.
Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC,* (Plaintiff) v. *Nintendo Co., Ltd. et al.*, (Defendant), United States District Court for the District of Maryland Southern Division (May 16, 2011), Exhibit 3, 85 pages.
Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC,* (Plaintiff) v. *Nintendo Co., Ltd. et al.*, (Defendant), United States District Court for the District of Maryland Southern Division (May 16, 2011), Exhibit 4, 10 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 5, 9 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 6, 17 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 7, 16 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 8, 45 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 9, 4 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 10, 22 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 11, 27 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 12, 3 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 13, 7 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 14, 22 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 15, 45 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 16, 42 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 17, 19 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 18, 27 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 19, 13 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 20, 29 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 21, 25 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 22, 11 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 23, 20 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 24, 7 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 25, 80 pages.

Declaration of Tyler C. Peterson Pursuant to Fed. R. Civ. P. 56(D) In Support of Nintendo Co., Ltd. and Nintendo of American Inc.'s Opposition to Plaintiff's Motion for Partial Summart Judgment, *IA Labs CA, LLC*, (Plaintiff) v. *Nintendo Co., Ltd. et al.*, (Defendant), United States District Court for the District of Maryland Southern Division (May 16, 2011), Exhibit 26, 32 pages.

U.S. Appl. No. 74/402,755, filed Jun. 14, 1993, 43 pages.

"AccuSway Dual Top: for Balance and Postural Sway Measurement," AMTI: Force and Motion, ISO 9001:2000, 2 pages.

Borzelli G., Cappozzo A., and Papa E., "Inter- and intra-individual variability of ground rejection forces during sit-to-stand with principal component analysis," Medical Engineering & Physics 21 (1999), pp. 235-240.

Chiari L., Cappello A., Lenzi D., and Della Croce U, "An Improved Technique for the Extraction of Stochasitc Parameters from Stabilograms," Gait and Posture 12 (2000), pp. 225-234.

Cutlip R., Hsiao H., Garcia R., Becker E., Mayeux B., "A comparison of different postures for scaffold end-frame disassembly," Applied Ergonomics 31 (2000), pp. 507-513.

Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.

Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.

Jorgensen M.J., Marras W.S., "The effect of lumbar back support tension on trunk muscle activity," Clinical Biomechanics 15 (2000), pp. 292-294.

Deborah L. King and Vladimir M. Zatsiorsky, "Extracting gravity line displacement from stabilographic recordings," Gait & Posture 6 (1997), pp. 27-38.

Kraemer W.J., Volek J.S., Bush J.A., Gotshalk L.A., Wagner P.R., Gómez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.

Papa E. and Cappozzo A., "A telescopic inverted-pendulum model of the musculo-skeletal system and its use for the analysis of the sit-to-stand motor task," Journal of Biomechanics 32 (1999), pp. 1205-1212.

Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).

BERTEC: Dominate Your Field, Physician's Quick Guide, Version 1.0.0, Feb. 2010, 13 pages.

BERTEC: Dominate Your Field, Balancecheck Screener, Version 1.0.0, Feb. 2010, 35 pages.

BERTEC: Dominate Your Field, Balancecheck Trainer, Version 1.0.0, Feb. 2010, 37 pages.

BERTEC Corporation—Balancecheck Standard Screener Package, http://bertec.com/products/balance-systems/standard-screener.html, 1 page. (Retrieved Apr. 12, 2011).

BERTEC Corporation—Balance Systems: Balancecheck Advanced balance assessment & training products for the balance professional, http://bertec.com/products/balance-systems.html, 1 page. (Retrieved Mar. 31, 2011).

BERTEC Corporation—Balancecheck Mobile Screener Package: Portable balance screening with full functionality, http://bertec.com/products/balance-systems/mobile-screener.html, 1 page. (Retrieved Mar. 31, 2011).

BERTEC Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).

U.S. Appl. No. 75/136,330, filed Jul. 19, 1996, 47 pages.

BERTEC: Dominate Your Field, Digital Acquire 4, Version 4.0.10, Mar. 2011, 22 pages.

BERTEC: Dominate Your Field, Bertec Force Plates, Version 1.0.0, Sep. 2009, 31 pages.

U.S. Appl. No. 73/542,230, filed Jun. 10, 1985, 52 pages.

Brent L. Arnold and Randy J. Schmitz, "Examination of Balance Measures Produced by the Biodex Stability System," Journal of Athletic Training, vol. 33(4), 1998, pp. 323-327.

Trademark Registration No. 1,974,115 filed Mar. 28, 1994, 8 pages.

U.S. Appl. No. 75/471,542, filed Apr. 16, 1998, 102 pages.

VTI Force Platform, Zapconnect.com: Medical Device Industry Portal, http://zapconnect.com/products/index.cfm/fuseaction/products, 2 pages. (Retrieved Apr. 5, 2011).

Amin M., Girardi M., Konrad H.R., Hughes L., "A Comparison of Electronystagmorgraphy Results with Posturography Findings from the BalanceTrak 500," Otology Neurotology, 23(4), 2002, pp. 488-493.

Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.

Dr. Guido Pagnacco, Publications, 1997-2008, 3 pages.

College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).

EyeTracker, IDEAS, DIFRA, 501(k) Summary: premarket notification, Jul. 5, 2007, 7 pages.

Vestibular technologies, copyright 2000-2004, 1 page.

Scopus preview—Scopus—Author details (Pagnacco, Guido), http:www.scopus.com/authid/detail.url?authorId=6603709393, 2 pages. (Retrieved Apr. 20, 2011).

Vestibular Technologies Company Page, "Vestibular technologies: Helping People Regain their Balance for Life," http:www.vestibtech.com/AboutUs.html, 2 pages. (Retrieved Apr. 20, 2011).

GN Otometrics Launces ICS Balance Platform: Portable system for measuring postural sway, http://audiologyonline.com/news/pf_news_detail.asp?news_id=3196, 1 page. (Retrieved Mar. 31, 2011).

U.S. Appl. No. 75/508,272, filed Jun. 25, 1998, 36 pages.

U.S. Appl. No. 75/756,991, filed Jul. 21, 1999, 9 pages.

U.S. Appl. No. 76/148,037, filed Oct. 17, 2000, 78 pages.

Vestibular technologies, VTI Products: BalanceTRAK User's Guide, Preliminary Version 0.1, 2005, 34 pages.

U.S. Appl. No. 76/148,037, filed Oct. 17, 2000, 57 pages.

Vestibular Technologies, Waybackmachine, http://vestibtech.com/balancetrak500.html, 7 pages. (Retrieved Mar. 30, 2011).

Vestibular Technologies, 2004 Catalog, 32 pages.

State of Delaware: The Official Website of the First State, Division of Corporations—Online Services, http://delecorp.delaware.gov/tin/controller, 2 pages. (Retrieved Mar. 21, 2011).

Memorandum in Support of Plaintiff IA Labs' Motion for Partial Summary Judgment on Defendants' Affirmative Defense and Counterclaim That U.S. Patent No. 7,121,982 Is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.

Addlesee, M.D., et al., "The Orl Active Floor," IEEE—Personal Communications, Oct. 1997.

Baek, Seongmin, et al., "Motion Evaluation for VR-based Motion Training," Eurographics 2001, vol. 20, No. 3, 2001.

Chen, I-Chun, et al., "Effects of Balance Training on Hemiplegic Stroke Patients," Chang Gung Medical Journal, vol. 25, No. 9, pp. 583-590, Sep. 2002.

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.

Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.

Harikae, Miho, "Visualization of Common People's Behavior in the Barrier Free Environment," Graduate Thesis—Master of Computer Science and Engineering in the Graduate School of the University of Aizu, Mar. 1999.

Hodgins, J.K., "Three-Dimensional Human Running," Proceedings: 1996 IEEE International Conference on Robotics and Automation, vol. 4, Apr. 1996.

Kim, Jong Yun, et al., "Abstract—A New VR Bike System for Balance Rehabilitation Training," Proceedings: 2001 IEEE Seventh International Conference on Virtual Systems and Multimedia, Oct. 2001.

McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.

Nicholas, Deborah S, "Balance Retraining After Stroke Using Force Platform Feedback," Physical Therapy, vol. 77, No. 5, pp. 553-558, May 1997.

Redfern, Mark, et al., "Visual Influences of Balance," Journal of Anxiety Disorders, vol. 15, pp. 81-94, 2001.

Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.

Tossavainen, Timo, et al., "Postural Control as Assessed with Virtual Reality," Acta Otolaryngol, Suppl 545, pp. 53-56, 2001.

Tossavainen, Timo, et al., "Towards Virtual Reality Simulation in Force Platform Posturography," MEDINFO, pp. 854-857, 2001.

Tsutsuguchi, Ken, et al., "Human Walking Animation Based on Foot Reaction Force in the Three-Dimensional Virtual World," The Journal of Visualization and Computer Animation, vol. 11, pp. 3-16, 2000.

Wong, Alice, et al., "The Devlopment and Clinical Evaluation of a Standing Biofeedback Trainer," Journal of Rehabilitation Research and Development, vol. 34, No. 3, pp. 322-327, Jul. 1997.

Yang, Ungyeon, et al., "Implementation and Evaluation of 'Just Follow Me': An Immersive, VR-Based, Motion-Training System," Presence, vol. 11, No. 3, pp. 304-323, 2002.

* cited by examiner

F I G. 1
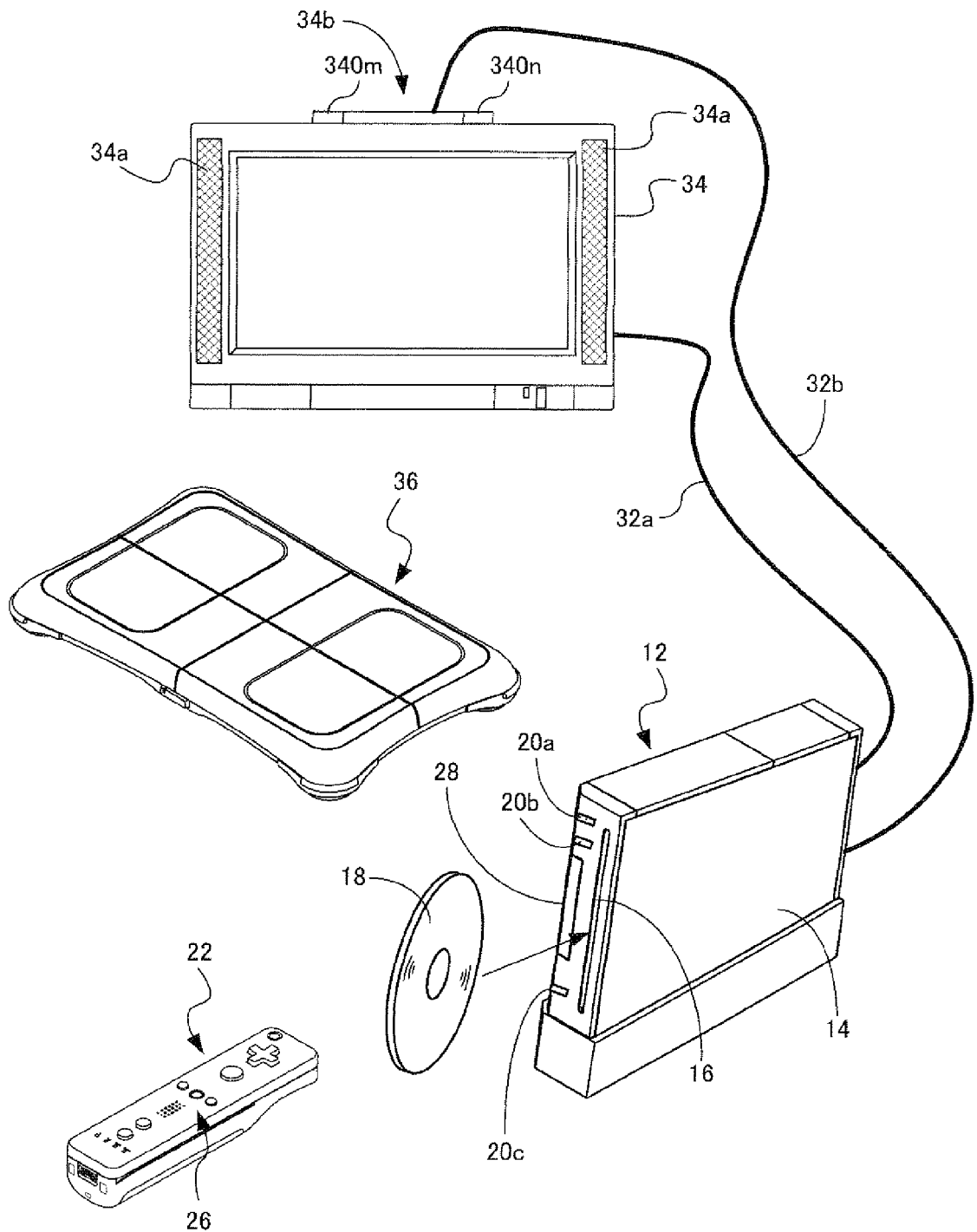

F I G. 7
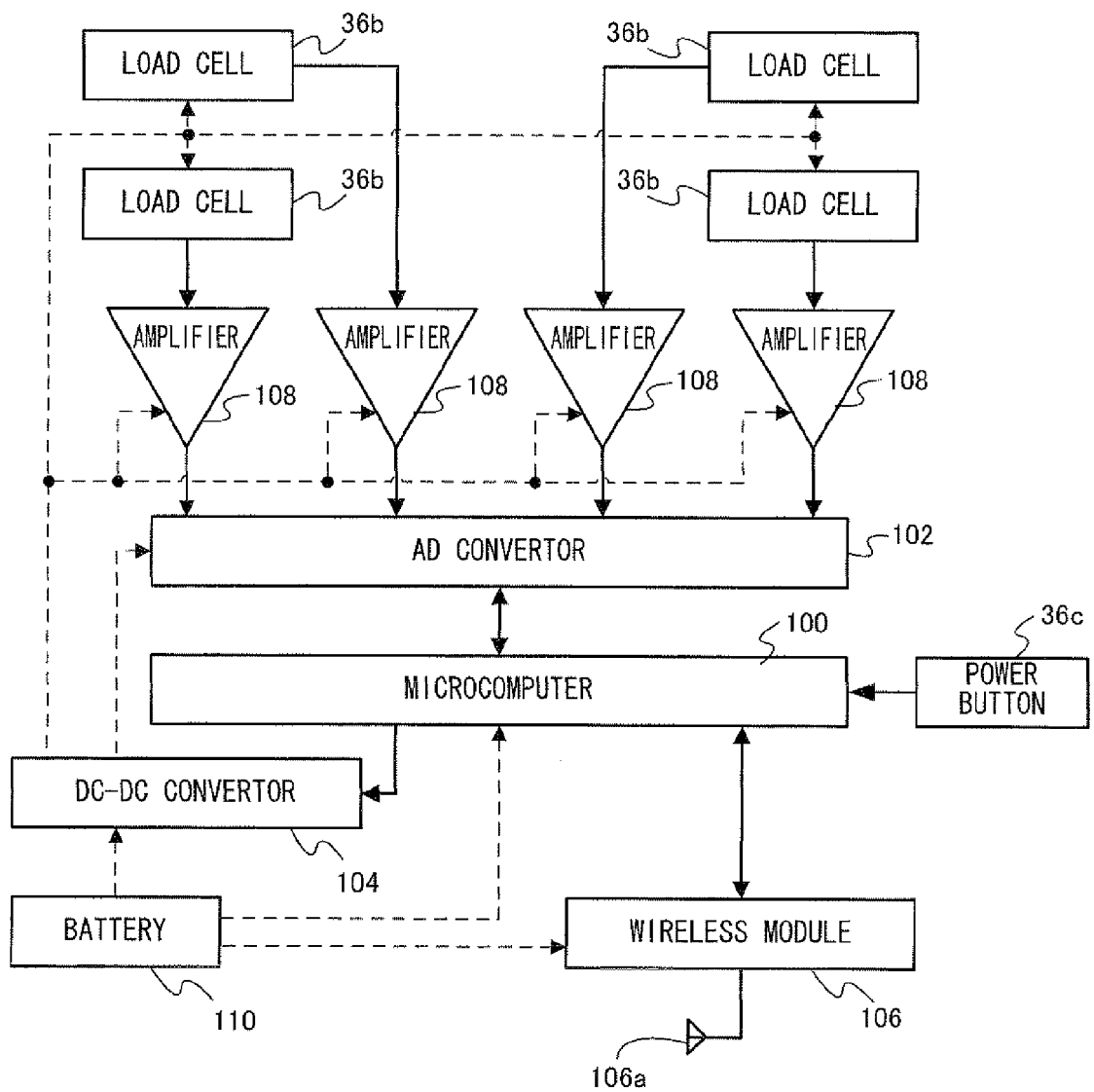

F I G. 2 1
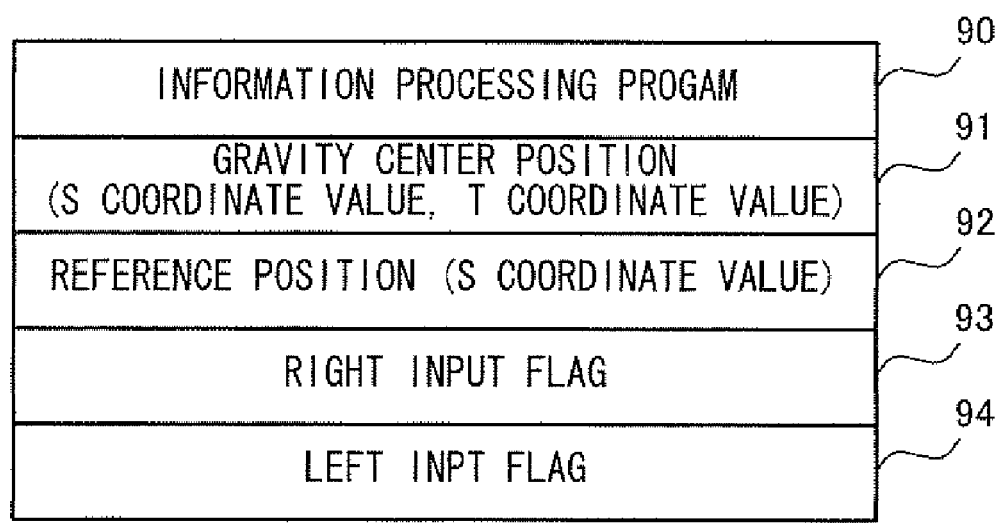

COMPUTER-READABLE STORAGE MEDIUM AND INFORMATION PROCESSING APPARATUS

CROSS REFERENCE TO RELATED APPLICATION

The disclosure of Japanese Patent Application No. 2009-83305, filed on Mar. 30, 2009, is incorporated herein by reference.

BACKGROUND OF THE INVENTION

1. Field of the Invention

The present invention relates to a computer-readable storage medium and an information processing apparatus, and in particular, to a computer-readable storage medium and an information processing apparatus that execute a predetermined process based on the gravity center position of a user.

2. Description of the Background Art

Conventionally, there is a known information processing program that moves, based on the gravity center position of a user, a character displayed on a screen (e.g. see Japanese Patent Laid-Open Publication No. 2005-334083). In this information processing program, a predetermined neutral area is set. When the gravity center position is moved out of the neutral area, movement of the character is started, and when the gravity center position is not moved out of the neutral area, the character is not moved.

However, in an information processing program disclosed in Japanese Patent Laid-Open Publication No. 2005-334083, because there is the possibility that the gravity center position is different among users, there is the case where, even though a user desires to move a character, the character is not moved because the gravity center position of the user is not out of a predetermined neutral area; and there is the case where, even though the user does not desire to move the character, the character is moved because the gravity center position of the user is moved out of the predetermined neutral area. Thus, the user cannot move the character as intended, and there is a problem that the user cannot obtain excellent operational feeling.

SUMMARY OF THE INVENTION

Therefore, an object of the present invention is to improve user's operational feeling in a computer-readable storage medium and an information processing apparatus that execute a predetermined process based on the gravity center position of a user.

The present invention has the following features to attain the object mentioned above.

One example of a computer-readable storage medium of the present invention is a computer-readable storage medium having stored thereon an information processing program that causes a computer of an information processing apparatus to operate as gravity center position detection means, process means, and reference position update means.

The gravity center position detection means detects a gravity center position of a user based on a signal from a gravity center position detection device.

The process means performs a predetermined process based on a relative position of the gravity center position, detected by the gravity center position detection means, with respect to a reference position or a reference area that is stored in a storage area.

The reference position update means updates, based on the gravity center position detected by the gravity center position detection means, the reference position or the reference area that is stored in the storage area.

The reference position update means sequentially may update, based on the gravity center position detected sequentially by the gravity center position detection means, the reference position stored in the storage area.

Thus, during execution of a process using the gravity center position of the user (e.g. during playing of a game using the gravity center position), even when the player unintentionally moves their gravity center position from the intended position (e.g. even when the user believes that the player performs steps at the center of a load controller but the gravity center position is actually unintentionally moved gradually rightward), the reference position can be sequentially updated to be a more appropriate position.

The reference position update means may update the reference position stored in the storage area, so as to approach the gravity center position detected by the gravity center position detection means.

Thus, even when there is a problem of eccentric positions of the gravity centers due to individual difference among users, or even when there is a problem of unintentional movement of the gravity center position of the user, the reference position can be updated so as to eliminate these problems. Further, for example, when the user performs another process by moving their gravity center position in the opposite direction with respect to the reference position after performing a process by moving their gravity center position in a direction with respect to the reference position, a movement distance of the gravity center that is required for the user to perform the other process after performing the process is shortened because the reference position approaches the gravity center position, and responsiveness improves.

The reference position update means may update, in a phased manner, the reference position stored in the storage area, so as to approach, in a phased manner, the gravity center position detected by the gravity center position detection means.

The reference position update means may repeat a process of updating the reference position stored in the storage area, to be a position between the reference position and the gravity center position detected by the gravity center position detection means.

The reference position update means may update the reference position stored in the storage area, so as to approach, at a predetermined rate, the gravity center position detected by the gravity center position detection means.

The process means: (a) may perform a first process when the gravity center position detected by the gravity center position detection means is distant from the reference position stored in the storage area, in a first direction for a constant distance or longer; and (b) may perform a second process when the gravity center position detected by the gravity center position detection means is distant from the reference position stored in the storage area, for the constant distance or longer in a second direction different from the first direction.

Thus, responsiveness improves when the user performs one of the first process and the second process by using the gravity center position detection device and then performs the other process.

The reference position update means: (a) may move the reference position stored in the storage area, in the first direction when the gravity center position detected by the gravity center position detection means is distant from the reference position stored in the storage area, in the first direction for the constant distance or longer; and (b) may move the reference position stored in the storage area, in the second direction when the gravity center position detected by the gravity center position detection means is distant from the reference position stored in the storage area, for the constant distance or longer in the second direction opposite to the first direction.

Thus, responsiveness improves when the user performs one of the first process and the second process by using the gravity center position detection device and then performs the other process.

The process means: (a) may be capable of executing only the second process out of the first process and the second process during a period after the first process is executed until the second process is executed: and (b) may be capable of executing only the first process out of the first process and the second process during a period after the second process is executed until the first process is executed.

The process means: (a) may perform a first process in accordance with a distance between the gravity center position and the reference position when the gravity center position detected by the gravity center position detection means is located in a first direction with respect to the reference position stored in the storage area; and (b) may perform a second process in accordance with a distance between the gravity center position and the reference position when the gravity center position detected by the gravity center position detection means is located in a second direction different from the first direction, with respect to the reference position stored in the storage area.

Thus, responsiveness improves when the user performs one of the first process and the second process by using the gravity center position detection device and then performs the other process.

The reference position update means: (a) may move the reference position stored in the storage area, in the first direction when the gravity center position detected by the gravity center position detection means is located in the first direction with respect to the reference position stored in the storage area; and (b) may move the reference position stored in the storage area, in the second direction opposite to the first direction, when the gravity center position detected by the gravity center position detection means is located in the second direction with respect to the reference position stored in the storage area.

Thus, responsiveness improves when the user performs one of the first process and the second process by using the gravity center position detection device and then performs the other process.

The reference position update means may update the reference position stored in the storage area, so as to approach the gravity center position detected by the gravity center position detection means, with a predetermined approach limit position as a limit.

Thus, the reference position does not approach the gravity center position to reach the gravity center position, and hence the user can continuously input an instruction for any one of the first process and the second process by using the gravity center position detection device.

The information processing program may further cause the computer to operate as approach limit position setting means for setting the approach limit position based on the gravity center position detected by the gravity center position detection means.

Thus, the approach limit position can be adaptively set to an appropriate position.

The information processing program may further cause the computer to operate as display control means for generating an image showing the gravity center position detected by the gravity center position detection means and the reference position that has been updated by the reference position update means, and for outputting the image to a display device.

Thus, a state where the reference position changes moment by moment can be displayed to the user.

The information processing program may further cause the computer to operate as movement detection means for detecting, based on a signal from an operating device held by the user, movement of the operating device, and the process means may perform the predetermined process based on both the relative position detected by the gravity center position detection means and the movement of the operating device detected by the movement detection means.

Thus, even when the user moves a part of their body by operating the operating device to unintentionally move their gravity center position, the reference position can be updated to a more appropriate position.

The gravity center position detection means may include determination means for determining in which of the reference area, a first area adjacent to the reference area, and a second area adjacent to the reference area and distant from the first area, the gravity center position of the user detected based on the signal from the gravity center position detection device is located, the process means may include: first process means for executing a first process in accordance with entry of the gravity center position into the first area; and second process means for executing a second process in accordance with entry of the gravity center position into the second area, and the reference position update means may include: first update means for updating, in accordance with the entry of the gravity center position into the first area, a position of the reference area so as to approach the gravity center position detected by the gravity center position detection means; and second update means for updating, in accordance with the entry of the gravity center position into the second area, the position of the reference area so as to approach the gravity center position detected by the gravity center position detection means.

One example of an information processing apparatus of the present invention is an information processing apparatus comprising gravity center position detection means, process means, and reference position update means.

The gravity center position detection means detects a gravity center position of a user based on a signal from a gravity center position detection device.

The process means performs a predetermined process based on a relative position of the gravity center position, detected by the gravity center position detection means, with respect to a reference position or a reference area that is stored in a storage area.

The reference position update means updates, based on the gravity center position detected by the gravity center position detection means, the reference position or the reference area that is stored in the storage area.

According to the present invention, user's operational feeling can be improved in a computer-readable storage medium and an information processing apparatus that execute a predetermined process based on the gravity center position of the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view of a game system according to one embodiment of the present invention;

FIG. 7 is a block diagram showing an example of an electrical configuration of the load controller;

FIG. 21 shows a memory map of an external main memory during execution of the first video game;

DESCRIPTION OF THE PREFERRED EMBODIMENTS

Figure 2:
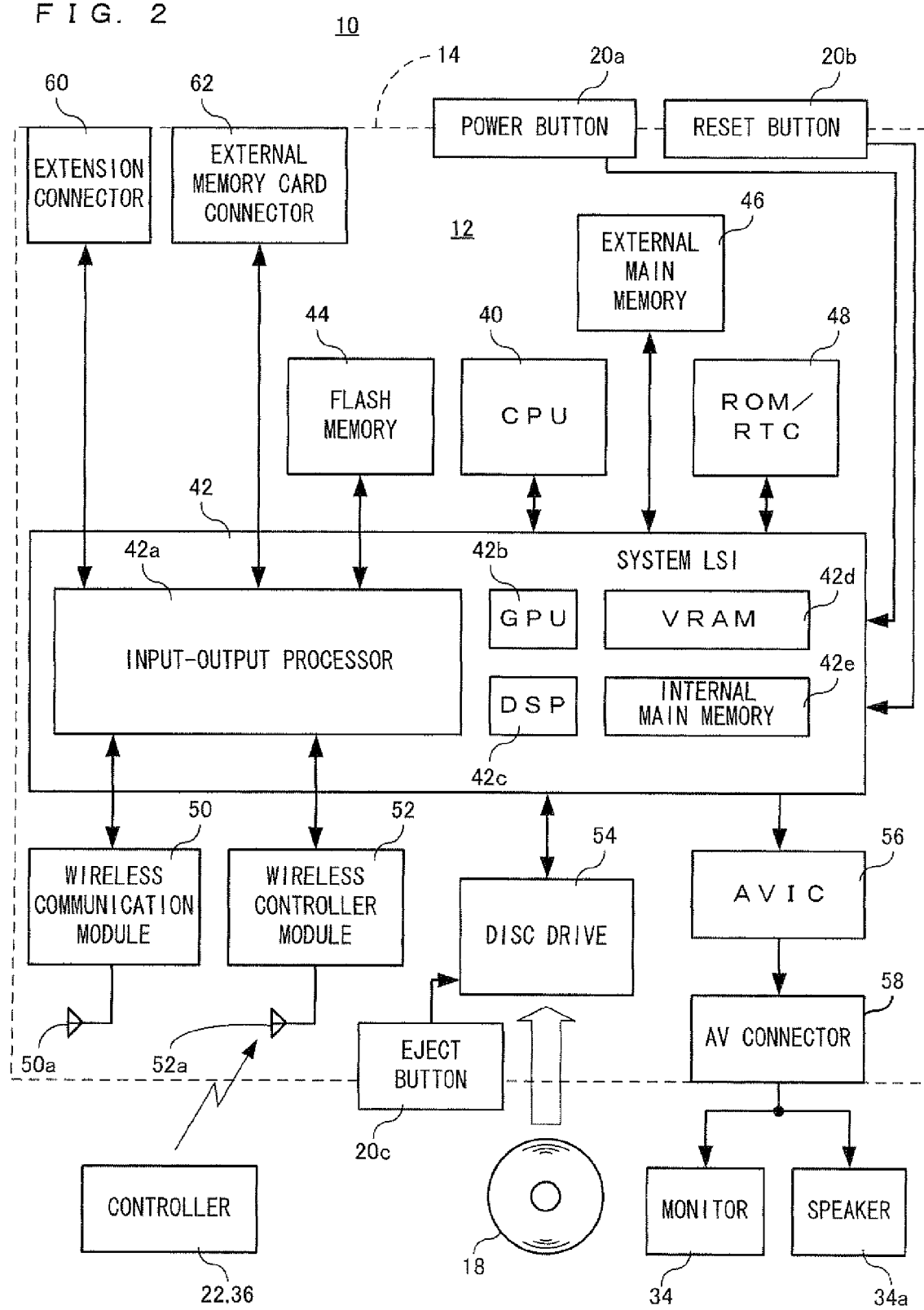
FIG. 2 is a block diagram showing an example of an electrical configuration of the game system.

The following will describe embodiments of the present invention with reference to the drawings.

(Game System)

First, a game system used in the present embodiment will be described. As shown in FIG. 1, a game system 10 includes a video game apparatus (hereinafter, referred to merely as "game apparatus") 12, a controller 22, and a load controller 36. Although not shown in the drawings, the game apparatus 12 of the present embodiment is designed so as to be capable of communicating wish four controllers (22, 36). The game apparatus 12 is connected to each controller (22, 36) wirelessly. For example, the wireless communication is performed in accordance with the Bluetooth standard, but may be performed in accordance with another standard of infrared communication, a wireless LAN, or the like.

The game apparatus 12 includes a parallelepiped-shaped housing 14 provided with a disc slot 16 on a front surface thereof. Through the disc slot 16, an optical disc 18, which is an example of an information storage medium having stored thereon a game program and the like, is inserted, and mounted to a disc drive 54 (see FIG. 2) in the housing 14. Around the disc slot 16, an LED and a light guide plate are arranged, and the LED is capable of being lit in response to various processes.

Further, on an upper portion of the front surface of the housing 14 of the game apparatus 12, a power button 20a and a reset button 20b are provided, and on a lower portion thereof, an eject button 20c is provided. In addition, an external memory card connector cover 28 is provided between the reset button 20b and the eject button 20c and adjacent to the disc slot 16. Inside the external memory card connector cover 28, an external memory card connector 62 (see FIG. 2) is provided, and an external memory card (not shown; hereinafter, referred to merely as "memory card") is inserted into the external memory card connector 62. The memory card is used for loading and temporally storing the game program and the like read out from the optical disc 18, and for storing (saving) game data (result data or midstream data of a game) of the game played using the game system 10. However, the game data may be stored in an internal memory such as a flash memory 44 (see FIG. 2) provided in the game apparatus 12, instead of the memory card. Further, the memory card may be used as a backup memory for the internal memory.

As the memory card, a general-purpose SD card can be used, but other general-purpose memory cards such as a memory stick and a Multi-Media Card (registered trademark) can be used.

On a rear surface of the housing 14 of the game apparatus 12, an AV connector 58 (see FIG. 2) is provided, and a monitor 34 and speakers 34a are connected to the game apparatus 12 through an AV cable 32a by means of the AV connector 58. The monitor 34 and the speakers 34a typically constitute a color television receiver, and a video signal and an audio signal from the game apparatus 12 are inputted to a video input terminal and an audio input terminal, respectively, of the color television receiver through the AV cable 32a. Thus, a game image of a three-dimensional (3D) video game is displayed on the screen of the color television receiver (monitor) 34, and stereo game sound such as game music, effect sound, and the like is outputted from both speakers 34a. Further, a marker section 34b including infrared LEDs (markers) 340m and 340n is provided adjacent to the monitor 34 (on the upper side of the monitor 34 in the present embodiment). The marker section 34b is connected to the game apparatus 12 through a power cable 32b. Thus, electric power is supplied from the game apparatus 12 to the marker section 34b. Whereby, the markers 340m and 340n emit infrared light forward from the monitor 34.

The electric power is supplied to the game apparatus 12 through a general AC adapter (not shown). The AC adapter is inserted into a household standard wall socket, and the game apparatus 12 converts household power (commercial power) into a low DC-voltage signal that is suitable for driving the game apparatus 12. In an alternative embodiment, a battery may be used as a power source.

In the game system 10, in order for a user (hereinafter, may be referred to as a player) to play a game (it is not limited thereto, and may be another application), the user turns on the game apparatus 12, and then selects an appropriate optical disc 18 storing the video game (or the other application that the user desires to play), and the optical disc 18 is loaded onto the disc drive 54 of the game apparatus 12. Accordingly, the game apparatus 12 starts to execute the video game or the other application based on a program stored in the optical disc 18. The user operates the controller 22 for performing an input to the game apparatus 12. For example, by operating any one of input means 26, the use starts the game or the other application. Further, in addition to operating the input means 26, by moving the controller 22, an image object (player object) can be moved in a different direction, or a viewpoint (camera position) of the user in a 3D game world can be changed.

FIG. 2 is a block diagram showing an electrical configuration of the game system 10. Although not shown in the drawings, each component in the housing 14 is mounted on a printed circuit board. As shown in FIG. 2, the game apparatus 12 is provided with a CPU 40. The CPU 40 functions as a game processor. The CPU 40 is connected to a system LSI 42. The system LSI 42 is connected to an external main memory 46, a ROM/RTC 48, the disc drive 54, and an AVICS 56.

The external main memory 46 stores a program, such as a game program and the like, and various data, and is used as a work area and a buffer area for the CPU 40. The ROM/RTC 48 includes a ROM (so-called boot ROM) that stores a program for starting up the game apparatus 12; and a clock circuit for counting time. The disc drive 54 reads program data and texture data from the optical disc 10, and writes these data into a later-described internal main memory 42e or the external main memory 46 under the control of the CPU 40.

The system LSI 42 is provided with an input-output processor (I/O process) 42a, a GPU (Graphics Processor Unit) 42b, a DSP (Digital Signal Processor) 42c, a VRAM 42d, and the internal main memory 42e. Although not shown in the drawings, these components are connected to each other through an internal bus.

The input-output processor 42a performs transmission and reception of data to and from each component connected to the input-output processor 42a, and downloads data. The transmission and reception of data and the download of data will be described in detail later.

The GPU 42b forms a part of drawing means, receives a graphics command (command for generating graphics) from the CPU 40, and generates an image according to the graphics command. In addition to the graphics command, the CPU 40 provides the GPU 42b with an image generation program required for generating game image data.

Although not shown in the drawings, the VRAM 42d is connected to the GPU 42b as described above. Prior to executing the graphics command, the GPU 42b accesses the VRAM 42d and obtains required data (image data: data such as polygon data, texture data, and the like). The CPU 40 writes image data, required for drawing an image, into the VRAM 42d through the GPU 42b. The CPU 42b accesses the VRAM 42d and generates game image data for drawing an image.

The present embodiment describes a case where the CPU 42b generates game image data. However, in a case of executing an arbitrary application other than the game application, the GPU 42b generates image data for the arbitrary application.

Further, the DSP 42c functions as an audio processor, and generates audio data, which correspond to sound, voice, and music outputted from the speakers 34a, by using sound data and sound waveform (tone color) data which are stored in the internal main memory 42e and the external main memory 46.

The image data and the audio data generated thus are read by the AVIC 56. The AVIC 56 outputs the image data and the audio data to the monitor 34 and the speakers 34a, respectively, through the AV connector 58. Thus, a game image is displayed on the monitor 34, and sound (music) required for the game is outputted from the speakers 34a.

Further, the Input-output processor 42a is connected to a flash memory 44, a wireless communication module 50, a wireless controller module 52, an extension connector 60, and the external memory card connector 62. The wireless communication module 50 is connected to an antenna 50a, and the wireless controller module 52 is connected to an antenna 52a.

The input-output processor 42a is capable of communicating with another game apparatus connected to a network and various servers connected to the network, through the wireless communication module 50. However, the input-output processor 42a is capable of communicating directly with the other game apparatus, not through the network. The input-output processor 42a periodically accesses the flash memory 44 to detect whether or not there is data (referred to as transmission data) required to be transmitted to the network. If there is the transmission data, the input-output processor 42a transmits the transmission data to the network through the wireless communication module 50 and the antenna 50a. The input-output processor 42a receives data (referred to as reception data) transmitted from the other game apparatus through the network, the antenna 50a, and the wireless communication module 50, and stores the reception data in the flash memory 44. In a predetermined case, the input-output processor 42a discards the reception data. In addition, the input-output processor 42a receives data downloaded from a download server through the network, the antenna 50a, and the wireless communication module 50, and stores the downloaded data in the flash memory 44.

Further, the input-output processor 42a receives input data transmitted from the controller 22 and the load controller 36 through the antenna 52a and the wireless controller module 52, and stores (temporarily stores) the input data in the buffer region of the internal main memory 42e or the external main memory 46. The input data in the buffer region is deleted after being used by a game process executed by the CPU 40.

In the present embodiment, as described above, the wireless controller module 52 communicates with the controller 22 and the load controller 36 in accordance with the Bluetooth standard.

For convenience's sake, the controller 22 and the load controller 36 are shown together as one unit in FIG. 2.

The input-output processor 42a is connected to the extension connector 60 and the external memory card connector 62. The extension connector 60 is a connector for an interface such as a USB and an SCSI, and enables connection of a medium such as an external storage medium and connection of a peripheral apparatus such as another controller. Further, instead of the wireless communication module 50, a wired LAN can be used by connecting a wired LAN adapter to the extension connector 60. To the external memory card connector 62, an external storage medium such as a memory card can be connected. Thus, for example, the input-output processor 42a is capable of accessing the external storage medium through the extension connector 60 or the external memory card connector 62 for storing data in the external storage medium and reading data from the external storage medium.

Although not described in detail, the game apparatus 12 (housing 14) is provided with the power button 20a, the reset button 20b, and the eject button 20c as shown in FIG. 1. The power button 20a is connected to the system LSI 42. When the power button 20a is turned on, electric power is supplied to each component of the game apparatus 12 through the AC adapter (not shown), and the system LSI 42 becomes a normal energized mode (referred to as "normal mode"). On the other hand, when the power button 20a is turned off, electric power is supplied to only some components of the game apparatus 12, and the system LSI 42 sets a mode (hereinafter, referred to as "standby mode") that minimizes power consumption. In the present embodiment, when the standby mode is set, the system LSI 42 performs an instruction to stop supplying electric power to components other than the input-output processor 42a, the flash memory 44, the external main memory 46, the ROM/RTC 48, the wireless communication module 50, and the wireless controller module 52. Thus, the standby mode is a mode in which the CPU 40 does not execute an application.

Even in the standby mode, electric power is supplied to the system LSI 42, but, a supply of electric power to the GPU 42b, the DSP 42c, and the VRAM 42d is stopped so as not to drive them, thereby reducing the power consumption.

Further, although not shown in the drawings, a fan is provided in the housing 14 of the game apparatus 12 for discharging heat of the CPU 40, the system LSI 42, and the like. In the standby mode, the fan is stopped.

When the standby mode is not desired to be used, settings are made so as not to use the standby mode, whereby a supply of electric power to all the circuit components is stopped when the power button 20a is turned off.

Further, switching between the normal mode and the standby mode can be performed by means of remote operation such as by turning on/off a power switch 26h (see FIG. 3B) of the controller 22. In the case where the remote operation is not performed, in the standby mode, settings may be made so as not to supply electric power to the wireless controller module 52.

The reset button 20b is also connected to the system LSI 42. When the reset button 200 is pressed, the system LSI 42 restarts a boot program of the game apparatus 12. The eject button 20c is connected to the disc drive 54. When the eject button 10c is pressed, the optical disc 18 is ejected from the disc drive 54.

(Controller)

Figure 3A:
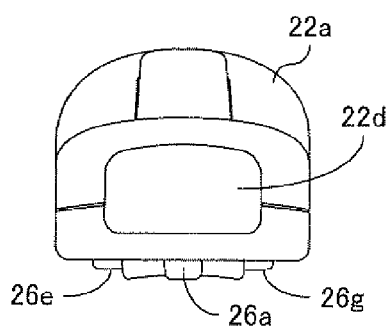
FIGS. 3A to 3E are an external view of a controller.
Figure 3E:
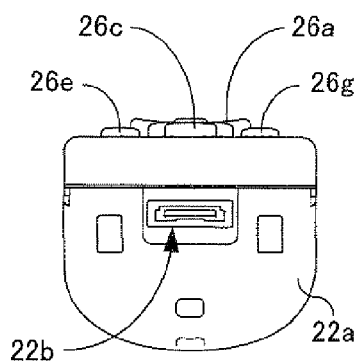
Figure 3B:
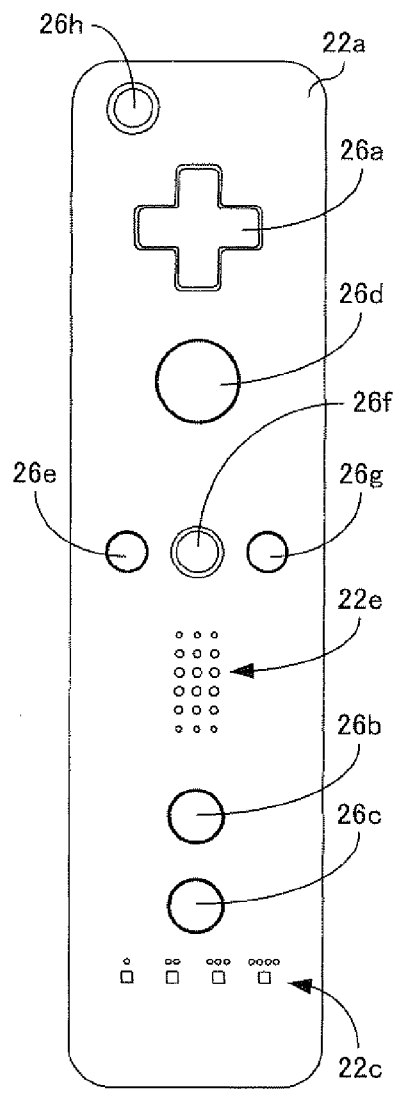
Figure 3C:
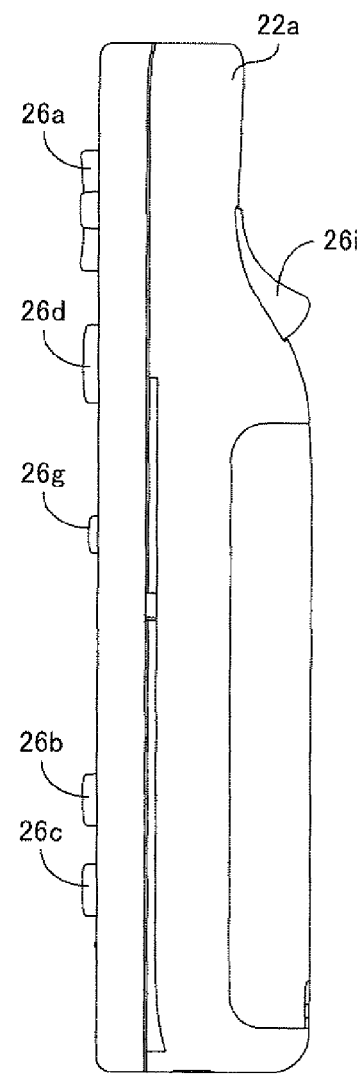
Figure 3D:
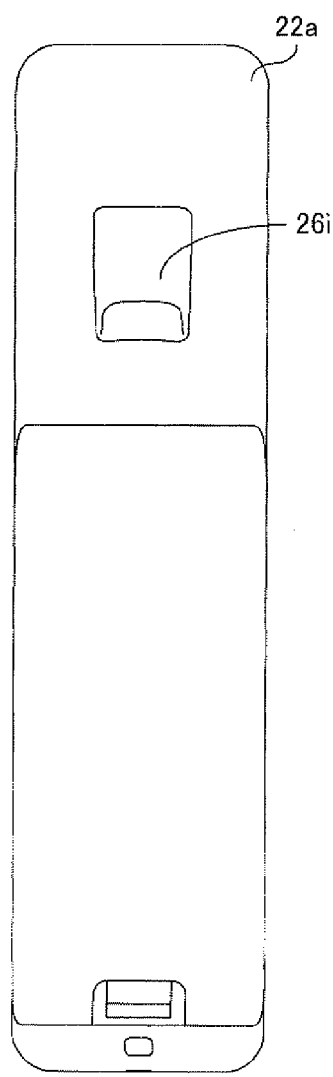

FIGS. 3A to 3E show an example of the external view of the controller 22. FIG. 3A shows a front surface of the controller 22, FIG. 3B shows a top surface of the controller 22, FIG. 3C shows a right side surface of the controller 22, FIG. 3D shows a bottom surface of the controller 22, and FIG. 3E shows a rear surface of the controller 22.

Referring to FIGS. 3A to 3E, the controller 22 includes a housing 22a that is formed, for example, by plastic molding. The housing 22a has a generally parallelepiped shape, and its overall size is small enough to be held by one hand of the user. On the housing 22a (controller 22), the input means (a plurality of buttons and switches) 26 are provided. Specifically, as shown in FIG. 3B, a cross key 26a, a 1 button 26b, a 2 button 26c, an A button 26d, a − button 26e, a HOME button 26f, a + button 26g, and the power switch 26h are provided on the top surface of the housing 22a. As shown in FIGS. 3C and 3D, aslope surface is formed in the bottom surface of the housing 22a, and a B trigger switch 26i is provided on the slope surface.

The cross key 26a is a cross-shaped four-direction push switch, and includes operation portions corresponding to four directions, frontward (or upward), rearward (or downward), rightward, and leftward, indicated by arrows. By operating any one of the operation portions, the player can perform an instruction of a direction in which a character or an object (a player character or a player object) operable by the player moves, and can perform an instruction of a direction in which a cursor moves.

The 1 button 26b and the 2 button 26c are push-button switches. For example, the 1 button 26b and the 2 button 26c are used for game operations, such as adjustment of a viewing position and a viewing direction, namely, the viewing position and the viewing angle of a virtual camera, when displaying a three-dimensional game image, and the like. Or, the 1 button 26b and the 2 button 26c may be used when the same operation as the A button 26d and the B trigger switch 26i is performed or an auxiliary operation is performed.

The A button 26d is a push-button switch, and is used for performing an instruction, other than a direction instruction, causing the player character or the player object to perform a motion, namely, an arbitrary action such as hitting (punching), throwing, grabbing (obtaining), riding, jumping, and the like. For example, in an action game, an instruction for jumping, punching, moving a weapon, and the like can be performed. Further, in a role-playing game (RPG) or a simulation RPG, an instruction for obtaining an item, selecting or deciding on a weapon or a command, and the like can be performed.

The − button 26e, the HOME button 26f, the + button 26g, and the power switch 26h are also push-button switches. The − button 26e is used for selecting a game mode. The HOME button 26f is used for displaying a game menu (menu screen). The + button 26g is used for starting (restarting) or pausing a game. The power switch 26h is used for turning on/off the game apparatus 12.

In the present embodiment, the controller 22 is not provided with a power switch for turning of/off the controller 22. The controller 22 is turned on by operating any one of the input means 26 of the controller 22, and is automatically turned off when the input means 26 are not performed for a certain time period (e.g. 30 seconds).

The B trigger switch 26i is also a push-button switch, and is used mainly for performing an input simulating a trigger for shooting a bullet, and for designating a position selected by using the controller 22. When the B trigger switch 26i is continuously pressed, a motion and a parameter of the player object can be maintained in a constant state. In a predetermined case, the B trigger switch 26i functions similarly as a normal B button, and is used for canceling an action decided by using the A button 26d, and the like.

Further, as shown in FIG. 3E, an external extension connector 22b is provided on the rear surface of the housing 22a. As shown in FIG. 3B, an indicator 22c is provided on the top surface of the housing 22a and near the rear surface. The external extension connector 22b is used for connecting to an extension controller (not shown). The indicator 22c consists of, for example, four LEDs, and any one of the four LEDs can be lit for indicating identification information (a controller number) of a controller 22 corresponding to the lit LED, and one or some of LEDs are lit for indicating the remaining amount of power of the controller 22, which is represented by the number of the lit LEDs.

Figure 4:
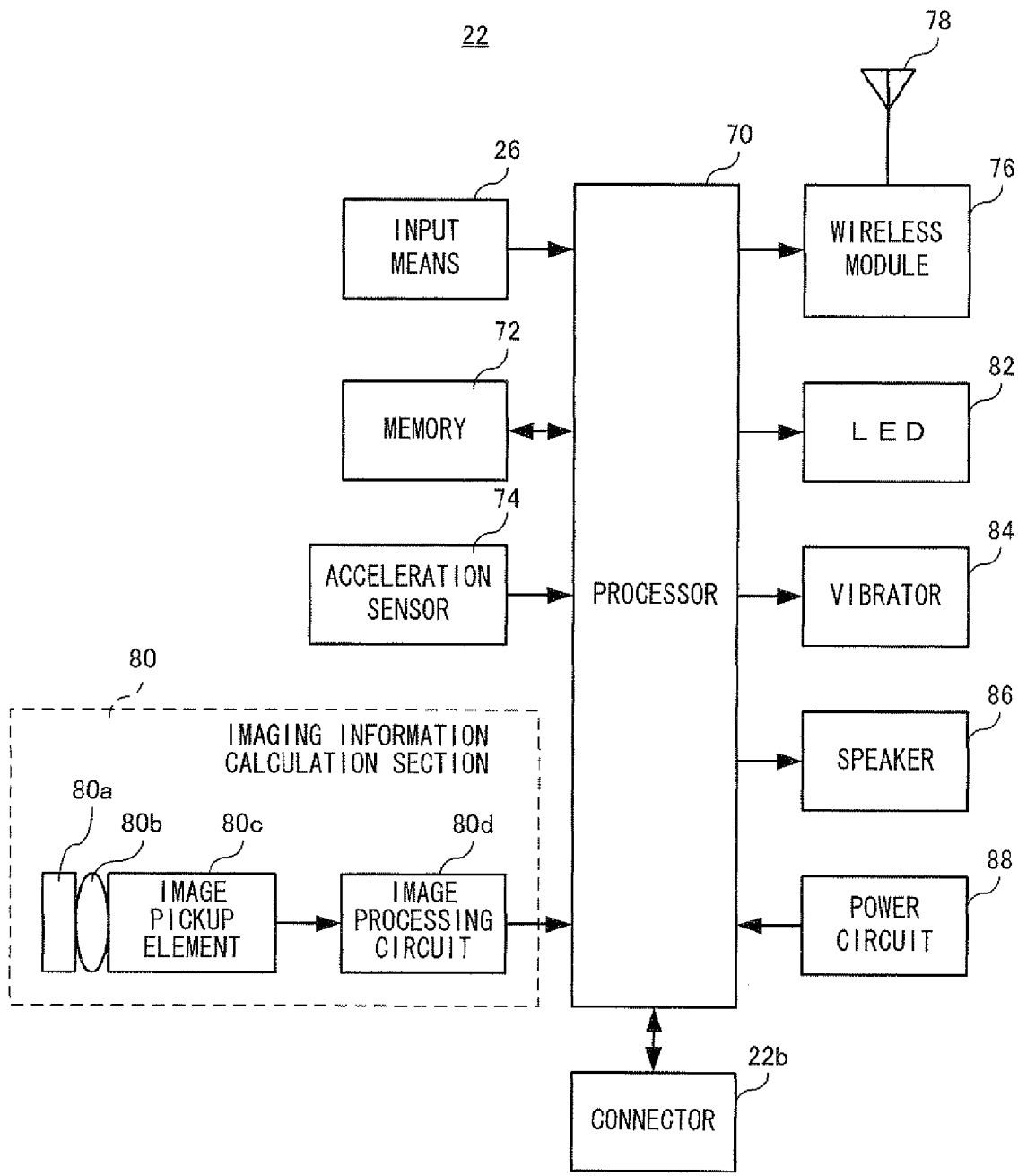
FIG. 4 is a block diagram showing an example of an electrical configuration of the controller.

Further, the controller 22 includes an imaging information calculation section 80 (see FIG. 4). As shown in FIG. 3A, a light opening 22d for the imaging information calculation section 80 is provided on the front surface of the housing 22a. The controller 22 also includes a speaker 86 (see FIG. 4) that is provided in the housing 22a in corresponding relation to sound holes 22e that are provided in the top surface of the housing 22a and between the 1 button 26b and the HOME button 26f as shown in FIG. 3B.

The shape of the controller 22, and the shapes, the number, and the installation positions of the input means 26 as shown in FIGS. 3A to 3E are merely an example, and the present invention can be achieved with other shapes, other numbers, and other installation positions.

FIG. 4 is a block diagram showing an electrical configuration of the controller 22. Referring to FIG. 4, the controller 22 includes a processor 70 that is connected to the external extension connector 22b, the input means 26, a memory 72, an acceleration sensor 74, a wireless module 76, the imaging information calculation section 80, an LED 82 (the indicator 22c), a vibrator 84, the speaker 86, and a power circuit 88 through an internal bus (not shown). The wireless module 76 is connected to an antenna 78.

The processor 70 conducts the entire control of the controller 22, and transmits (inputs) information (input information) inputted by the input means 26, the acceleration sensor 74, and the imaging information calculation section 80, as input data, to the game apparatus 12 through the wireless module 76 and the antenna 78. At this time, the processor 70 uses the memory 72 as a work area and a buffer area.

Operation signals (operation data) from the aforementioned input means 26 (26a-26i) are inputted to the processor 70, and the processor 70 stores once the operation data in the memory 72.

The acceleration sensor 74 detects acceleration in three directions, i.e., a vertical direction (y axis direction), a horizontal direction (x axis direction), and a front-rear direction (longitudinal direction) (z axis direction). The acceleration sensor 74 is typically an electrostatic capacitance type acceleration sensor, but may be of another type.

For example, the acceleration sensor 74 detects acceleration (ax, ay, az) along x axis, y axis, and z axis every first predetermined time period, and inputs data (acceleration data) of the detected acceleration to the processor 70. For example, the acceleration sensor 74 detects acceleration in each axial direction in a range between −2.0 g to 2.0 g (g denotes the gravitational acceleration; hereinafter, it is the same). The processor 70 detects the acceleration data, provided by the acceleration sensor 74, every second predetermined time period, and stores once the acceleration data in the memory 72. The processor 70 generates input data including at least one of the operation data, the acceleration data, and later-described marker coordinate data, and transmits the generated input data to the game apparatus 12 every third predetermined time period (e.g. 5 msec).

Although not shown in FIGS. 3A to 3E, in the present embodiment, the acceleration sensor 74 is provided on a substrate in the housing 22a and near the cross key 26a.

By using, for example, the Bluetooth (registered trademark) technology, the wireless module 76 modulates a carrier wave of a predetermined frequency with the operation data and radiates the resultant weak radio signal from the antenna 78. In other words, the input data is modulated by the wireless module 76 into the weak radio signal and transmitted from the antenna 78 (controller 22). The weak radio signal is received by the wireless controller module 52 provided in the aforementioned game apparatus 12. The received weak radio signal is demodulated and decoded, and thus the game apparatus 12 (CPU 40) can obtain the input data from the controller 22. Then, the CPU 40 performs the game process in accordance with the obtained input data and a program (game program).

Further, as described above, the controller 22 is provided with the imaging information calculation section 80. The imaging information calculation section 80 includes an infrared filter 80a, a lens 80b, an image pickup element 80c, and an image processing circuit 80d. The infrared filter 80a allows, among light incident on the front surface of the controller 22, only infrared light to pass therethrough. As described above, the markers 340m and 340n located adjacent to the display screen of the monitor 34 are infrared LEDS that emit infrared light forward from the monitor 34. Thus, images of the markers 340m and 340n can be accurately taken by providing the infrared filter 80a. The lens 80b converges the infrared light that has passed through the infrared filter 80a, and outputs the infrared light to the image pickup element 80c. The image pickup element 80c is a solid-state image pickup element such as a CMOS sensor and a CCD. The image pickup element 80c takes an image of the infrared light collected by the lens 80b. In other words, the image pickup element 80c takes an image of only the infrared light that has passed through the infrared filter 80c. Then, the image pickup element 80c generates image data of the image. Hereinafter, an image taken by the image pickup element 80c is referred to as a taken image. The image data generated by the image pickup element 80c is processed by the image processing circuit 80d. The image processing circuit 80d calculates the position of a target (the markers 340m and 340n) whose image is to be taken, and outputs each coordinate value, representing the position, as imaging data to the processor 70 every fourth predetermined time period. The processing by the image processing circuit 80d will be described later.

(Load Controller)

Figure 5:
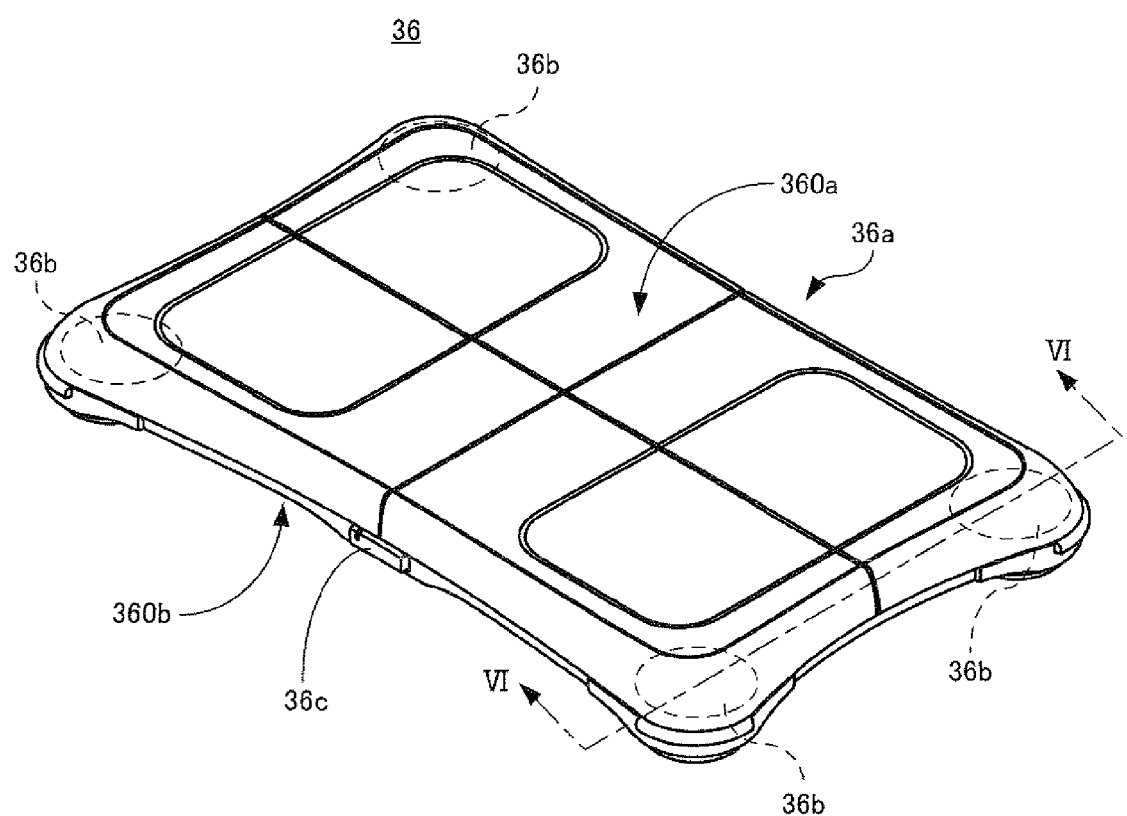
FIG. 5 is a perspective view of a load controller.

FIG. 5 is a perspective external view of the load controller 36 shown in FIG. 1. As shown in FIG. 5, the load controller 36 includes a stand 36a on which the player stands (on which the player puts his or her feet), and four load sensors 36b for detecting a load exerted on the stand 36a. Each load sensor 36b is contained in the stand 36a (see FIG. 7), and their locations are shown by dotted lines in FIG. 5.

The stand 36a is formed in a generally parallelepiped shape, and has a generally rectangular shape in top view. For example, the short side of the rectangle is set to about 30 cm, and the long side thereof is set to about 50 cm. The stand 36a has a flat top surface on which the player stands. The stand 36a has at four corners thereof side surfaces that are formed so as to partially project to have a cylindrical shape.

In the stand 36a, the four load sensors 36b are disposed at predetermined intervals. In the present embodiment, the four load sensors 36b are disposed at the periphery of the stand 36a, specifically, at the four corners thereof, respectively. The intervals among the load sensors 36b are set appropriately such that the load sensors 36b can accurately detect the intention of a game operation which is expressed by a manner of exerting a load on the stand 36a by the player.

Figure 6:
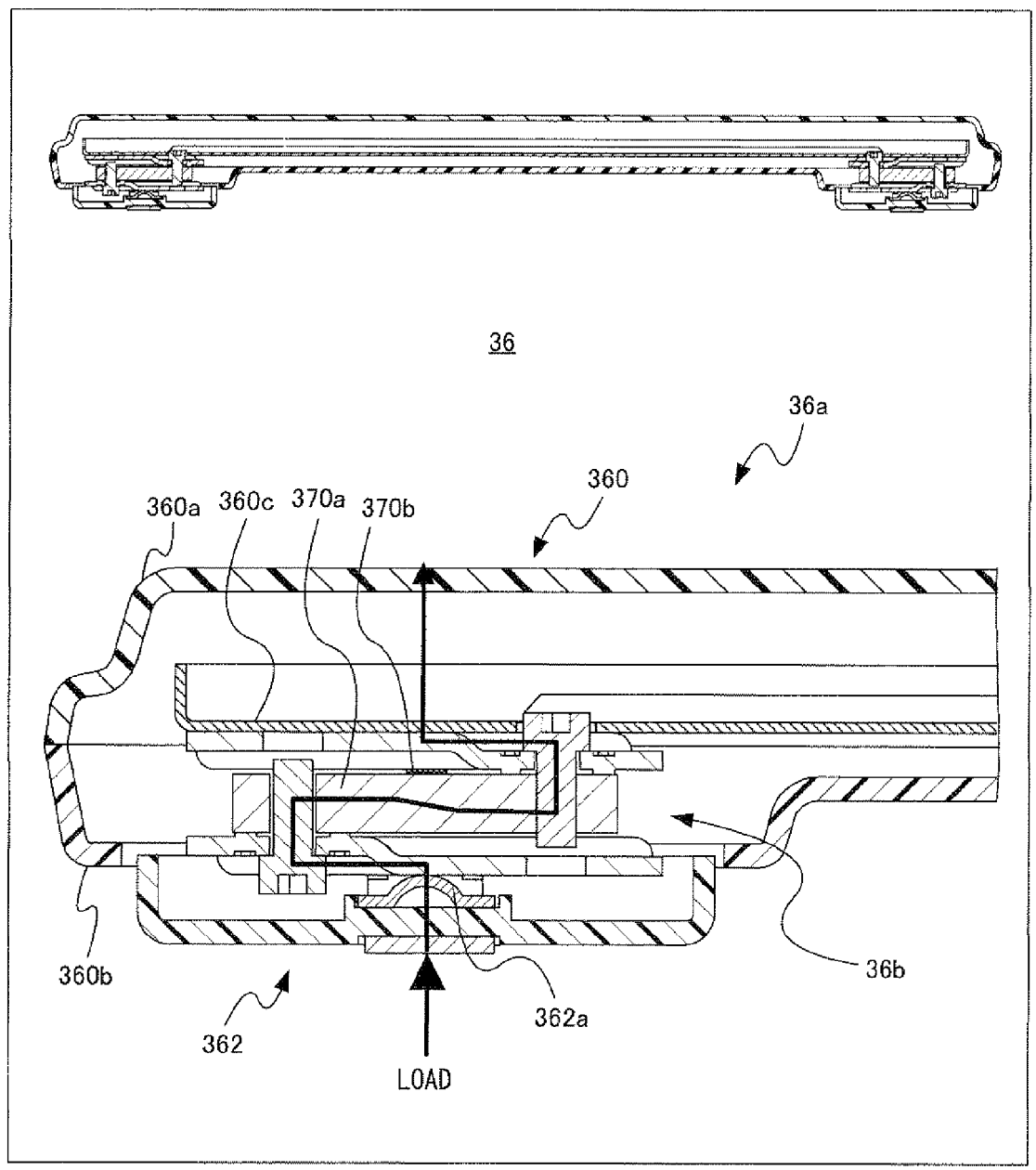
FIG. 6 is a cross-sectional view of the load controller taken along the VI-VI line in FIG. 5.

FIG. 6 shows a cross-sectional view of the load controller 36 taken along the VI-VI line in FIG. 5 and an enlarged view of a portion of the load controller 36 where the load sensor 36b is disposed. As is clear from FIG. 6, the stand 36a includes a support plate 360 on which the player stands, and legs 362. The legs 362 are provided at the positions where the load sensors 36b are disposed. In the present embodiment, because the four load sensors 36b are respectively disposed at the four corners, four legs 362 are provided. The legs 362 are formed in a generally cylindrical shape with a bottom, for example, by plastic molding. The load sensors 36b are respectively disposed on hemispherical parts 362a provided on the bottom surfaces in the legs 362. The support plate 360 is supported by the legs 362 through the load sensors 36b.

The support plate 360 includes an upper plate 360a that forms the top surface and a side surface upper portion, a lower plate 360b that forms a bottom surface and a side surface lower portion, and a mid plate 360c provided between the upper plate 360a and the lower plate 360b. The upper plate 360a and the lower plate 360b are formed, for example, by plastic molding, and integrated with each other by means of adhesion. The mid plate 360c is formed, for example, from one metallic plate by press molding. The mid plate 360c is fixed on the four load sensors 36b. The upper plate 360a has a grid-shaped rib (not shown) on the lower surface thereof, and is supported on the mid plate 360c through the rib. Thus, when the player stands on the stand 36a, the load is transmitted through the support plate 360, the load sensors 36b, and the legs 362. As shown by arrows in FIG. 6, the reaction from a floor, occurring by the exerted load, is transmitted to the upper plate 360a through the legs 362, the hemispherical parts 362a, the load sensors 36b, and the mid plate 360c.

The load sensors 36b are load converters that convert inputted loads into electric signals, for example, strain gauges (strain sensors) type load cells. In each load sensor 36b, according to the inputted load, a strain-generating body 370a deforms to generate strain. The strain is converted into a change of electric resistance by a strain sensor 370b attached to the strain-generating body 370a, and further converted into a voltage change. Thus, each load sensor 36b outputs a voltage signal indicative of the inputted load, from its output terminal.

Each load sensor 36b may be a load sensor of another type, such as a tuning fork vibration type, a string vibration type, an electrostatic capacitance type, a piezoelectric type, a magnetic strain type, and a gyro type.

Referring back to FIG. 5, the load controller 36 is provided with a power button 36c. When the power button 36c is turned on, electric power is supplied to each circuit component (see FIG. 7) of the load controller 36. It is noted that the load controller 36 may be turned on in accordance with an instruction from the game apparatus 12. When a state where the player does not stand on the load controller 36 continues for a certain time period (e.g. 30 seconds), the load controller 36 is turned off. However, when the power button 36c is pressed in a state where the load controller 36 is on, the load controller 36 may be turned off.

FIG. 7 is a block diagram showing an example of an electrical configuration of the load controller 36. In FIG. 7, flows of signals and communication are indicated by solid arrows. Dotted arrows indicate supply of electric power.

The load controller 36 includes a microcomputer 100 for controlling the operation of the load controller 36. The microcomputer 100 includes a CPU, a ROM, a RAM, and the like, which are not shown in the drawings. The CPU controls the operation of the load controller 36 in accordance with a program stored in the ROM.

The microcomputer 100 is connected to the power button 36c, an AD converter 102, a DC-DC converter 104, and a wireless module 106. The wireless module 106 is connected to an antenna 106a. The four load sensors 36b are shown as load cells 36b in FIG. 7. The four load sensors 36b are connected to the AD converter 102 through respective amplifiers 108.

Further, a battery 110 is contained in the load controller 36 for supplying electric power. In an alternative embodiment, instead of the battery, an AC adapter may be connected to the load controller 36 for supplying commercial power thereto. In this case, instead of the DC-DC converter, a power circuit, which converts alternating current into direct current and lowers and rectifies a direct current voltage, needs to be provided. In the present embodiment, electric power is supplied directly from the battery to the microcomputer 100 and the wireless module 106. In other words, the electric power is always supplied to the wireless module 106 and some components (the CPU) in the microcomputer 100 to detect whether or not the power button 36c is turned on and whether or not a command for turning on the power (load detection) is transmitted from the game apparatus 12. Meanwhile, the electric power is supplied from the battery 110 through the DC-DC converter 104 to the load sensors 36G, the AD converter 102, the amplifiers 108, and the battery 110. The DC-DC converter 104 converts a voltage value of direct current from the battery 110 into a different voltage value, and provides the resultant direct current to the load sensors 36b, the AD converter 102, and the amplifiers 108.

A supply of electric power to the load sensors 36b, the AD converter 102, and the amplifiers 108 may be conducted according to need by controlling the DC-DC converter 104 by the microcomputer 100. In other words, when it is determined that the load sensors 36b need to be activated to detect loads, the microcomputer 100 may control the DC-DC converter 104 so as to supply electric power to the load sensors 36b, the AD converter 102, and the amplifiers 108.

When the electric power is supplied, each load sensor 36b outputs a signal indicative of the inputted load. The signal is amplified by the corresponding amplifier 108, converted from the analog signal into digital data by the AD converter 102, and inputted to the microcomputer 100. Identification information of each load sensor 36bA is assigned to a detection value of each load sensor 36b such that it is possible to identify by which load sensor 36b the detection value is detected. As described above, the microcomputer 100 can obtain data indicative of each load detection value of the four load sensors 36b at the same time.

On the other hand, when it is determined that the load sensors 36b do not need to be activated, namely, that it is not a timing of load detection, the microcomputer 100 controls the DC-DC converter 104 so as to stop the supply of electric power to the load sensors 36b, the AD converter 102, and the amplifiers 108. As described above, in the load controller 36, because the load sensors 36b are activated to detect loads only when necessary, power consumption for load detection can be reduced.

A time when load detection is needed is typically a time when the game apparatus 12 (see FIG. 1) desires to obtain load data. For example, when the game apparatus 12 requires load information, the game apparatus 12 transmits a load obtaining command to the load controller 36. Upon receiving the load obtaining command from the game apparatus 12, the microcomputer 100 controls the DC-DC converter 104 so as to supply electric power to the load sensors 36b and the like for detecting loads. On the other hand, when not receiving a load obtaining command from the game apparatus 12, the microcomputer 100 controls the DC-DC converter 104 so as to stop the supply of electric power.

Alternatively, the microcomputer 100 may determine a timing of load detection every constant time period, and control the DC-DC converter 104. When such periodical load detection is conducted, information regarding the constant time period may be initially provided from the game apparatus 12 to the microcomputer 100 of the load controller 36 and stored therein, or may be stored in the microcomputer 100 in advance.

Data indicative of the detection values from the load sensors 36b is transmitted as operation data (input data) of the load controller 36 from the microcomputer 100 to the game apparatus 12 (see FIG. 1) through the wireless module 106 and the antenna 106a. For example, in the case of performing load detection according to a command from the game apparatus 12, when the microcomputer 100 receives the detection value data of the load sensors 36b from the AD converter 102, the microcomputer 100 transmits the detection value data to the game apparatus 12. Alternatively, the microcomputer 100 may transmit the detection value data to the game apparatus 12 every constant time period. When the interval of the load detection is longer than the interval of the transmission, data including load values detected at a plurality of detection timings until a transmission timing is transmitted.

It is noted that the wireless module 106 is set so as to perform communication according to the same wireless standard (the Bluetooth, a wireless LAN, and the like) as that for the wireless controller module 52 of the game apparatus 12. Thus, the CPU 40 of the game apparatus 12 is capable of transmitting a load obtaining command to the load controller 36 through the wireless controller module 52 and the like. The microcomputer 100 of the load controller 36 is capable of receiving the command from the game apparatus 12 through the wireless module 106 and the antenna 106a, and transmitting input data including a load detection value (or a load calculation value) of each load sensor 36b to the game apparatus 12.

In the case of a game executed based on the total of four load values detected by the four load sensors 36b, the player can stand at any position on the load controller 36 with respect to the four load sensors 36b, in other words, the player can play the game while standing at any position on the stand 36a and in any facing direction. However, depending on types of games, a process need to be executed while identifying which direction a load value detected by each load sensor 36b comes from with respect to the player, namely, it is necessary to know the positional relation between the four load sensors 36b of the load controller 36 and the player. In this case, for example, a positional relation between the four load sensors 36b and the player may be defined in advance, and it may be postulated that the player stands on the stand 36a so as to meet this predetermined positional relation. Typically, a positional relation in which two load sensors 36b are present on each of right and left sides or each of front and rear sides of the player standing at the center of the stand 36a, namely, a positional relation in which, when the player stands at the center of the stand 36a of the load controller 36, the load sensors 36b are present in the front right direction, the front left direction, the rear right direction, and the rear left direction from the player, respectively, is defined. In this case, in the present embodiment, because the stand 36a of the load controller 36 is formed in a rectangular shape in plan view and the power button 36c is provided at one side (long side) of the rectangle, it is defined in advance, using the power button 36c as a mark, that the player stands on the stand 36a such that the long side at which the power button 36c is provided is present in a predetermined direction (front, rear, left, or right) from the player. By doing so, a load value detected by each load sensor 36b becomes a load value in a predetermined direction (right front, left front, right rear, and left rear) from the player. Thus, the load controller 36 and the game apparatus 12 can identify which direction from the player each load detection value corresponds to, based on the identification information of each load sensor 36b which is included in the load detection value data and preset (prestored) position data indicative of a direction from the player to each load sensor 36b. Accordingly, it is possible to know the intention of a game operation, such as operation directions of front, rear, left, and right, which is expressed by the player.

The position of each load sensor 36b with respect to the player may not be defined in advance, and may be set by an input performed by the player at initial setting or at setting during a game. For example, the positional relation of each load sensor 36b with respect to the player can be specified by displaying an image for instructing the player to stand on a portion present in a predetermined direction (left front, right front, left rear, or right rear) from the player is displayed; and obtaining load values. Position data obtained by this setting may be generated and stored. Alternatively, a screen for selecting a position on the load controller 36 may be displayed on the monitor 34, and the player may be made to select in which direction from the player a mark (the power button 36c) is present, by an input with the controller 22. In accordance with this selection, position data of each load sensor 36b may be generated and stored.

(Game Play)

Figure 8:
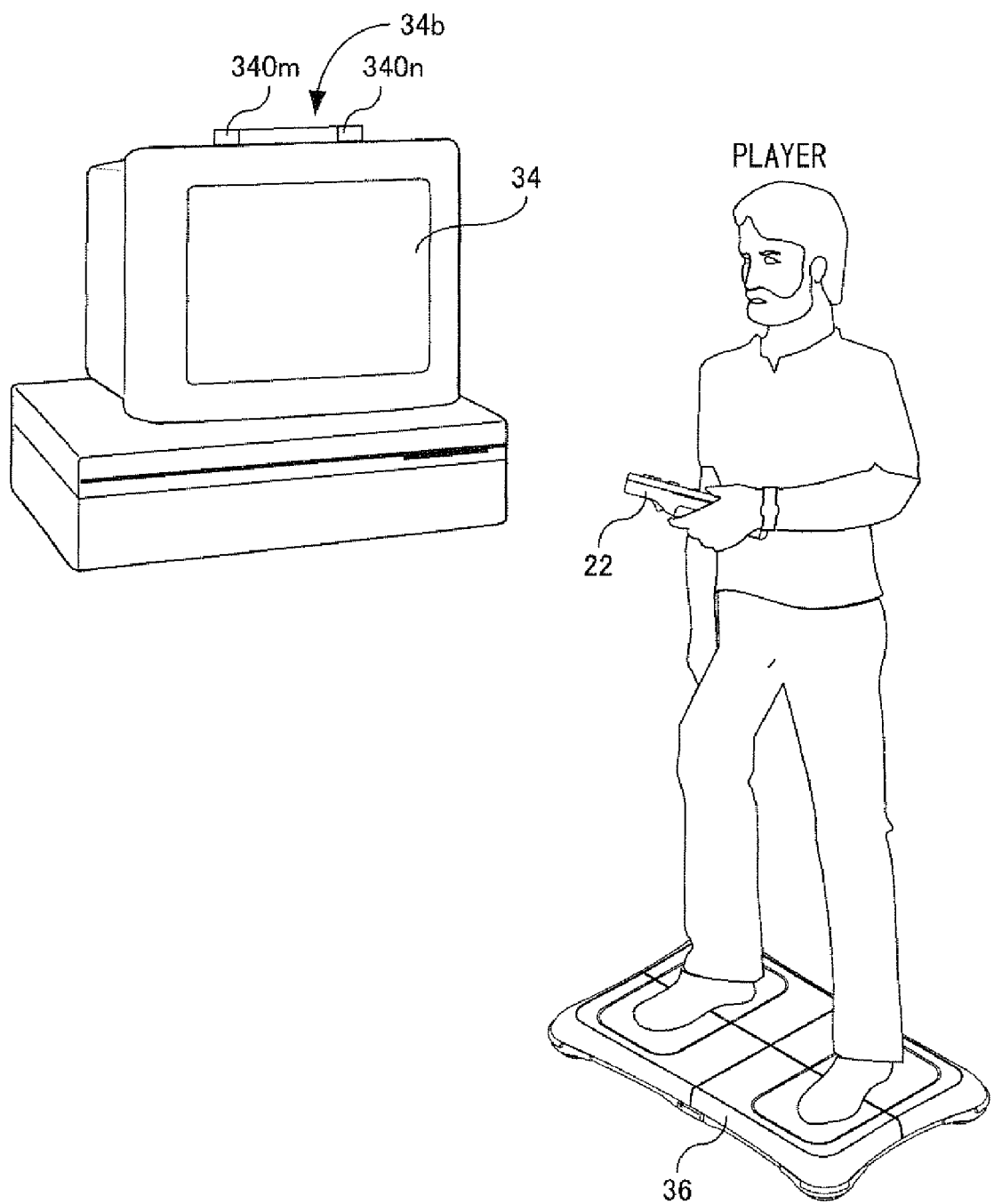
FIG. 8 is a view illustrating a state when a game is played by using the controller and the load controller.

FIG. 5 illustrates a state when a game is played by using the controller 22 and the load controller 36. As shown in FIG. 8, when a game is played with the game system 10 by using the controller 22 and the load controller 36, the player stands on the load controller 36 and holds the controller 22 with one hand. Specifically, the player stands on the load controller 36 and holds the controller 22 such that the front surface of the controller 22 (a side having the light opening 22d through which light is incident on the imaging information calculation section 80 taking an image of the light) faces the markers 340m and 340n. As is clear from FIG. 1, the markers 340m and 340n are arranged along the lateral direction of the screen of the monitor 34. In this state, the player performs game operations by changing the position to which the controller 22 points, or changing the distance between the controller 22 and each of the markers 340m and 340n.

FIG. 8 shows the case when the load controller 36 is placed lengthwise with respect to the screen of the monitor 34 (such that the long side direction thereof points toward the screen) and the player's right shoulder faces the screen of the monitors 34. However, the orientation of the load controller 36 with respect to the screen of the monitor 34 and the facing direction of the player can be changed as appropriate depending on types of games, and, for example, the load controller 36 may be oriented crosswise with respect to the screen of the monitor 34 (such that the long side direction thereof is parallel to the screen of the monitor 34) and the player faces the screen.

(Pointing)

Figure 9:
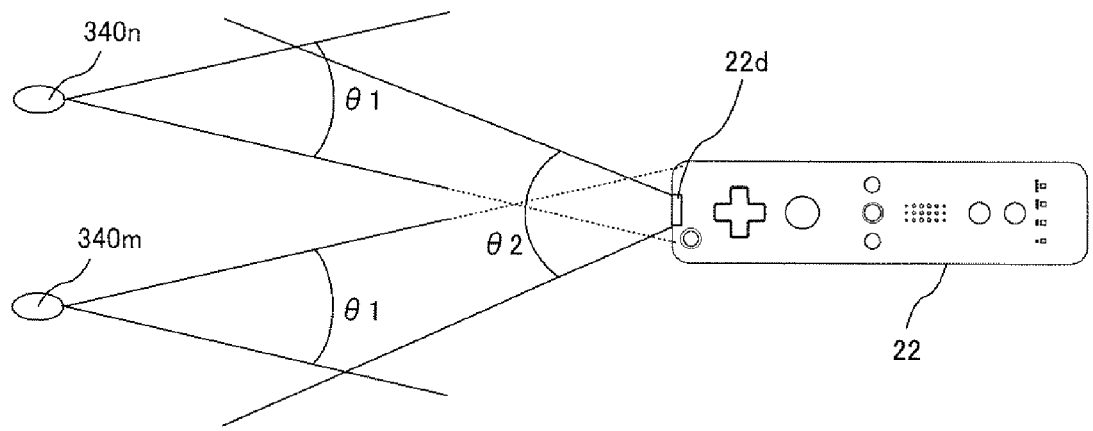
FIG. 9 is a view illustrating viewing angles of marker sections and the controller.

FIG. 9 is a view illustrating viewing angles of the markers 340m and 340n and the controller 22. As shown in FIG. 9, the markers 340m and 340n each emit infrared light at a viewing angle θ1. The image pickup element 80c of the imaging information calculation section 80 is capable of receiving light that is incident thereon in a range of a viewing angle $\theta 2$ centered at the view line direction of the controller 22. For example, the viewing angles $\theta 1$ of the markers 340*m* and 340*n* are 34° (half-value angle), and the viewing angle $\theta 2$ of the image pickup element 80*c* is 41°. The player holds the controller 22 such that the image pickup element 80*c* is oriented so as to be capable of receiving the infrared light from the markers 340*m* and 340*n*. Specifically, the player holds the controller 22 such that at least one of the markers 340*m* and 340*n* is present in the viewing angle $\theta 2$ of the image pickup element 80*c* and the controller 22 is present in the viewing angle $\theta 1$ of at least one of the markers 340*m* and 340*n*. In this state, the controller 22 is capable of detecting at least one of the markers 340*m* and 340*n*. The player can perform game operations by changing the position and the pointing direction of the controller 22 in a range that meets this state.

When the position and the pointing direction of the controller 22 are out of the ranger it becomes impossible to perform the game operations based on the position and the pointing direction of the controller 22. Hereinafter, this range is referred to as "operable range".

Figure 10:
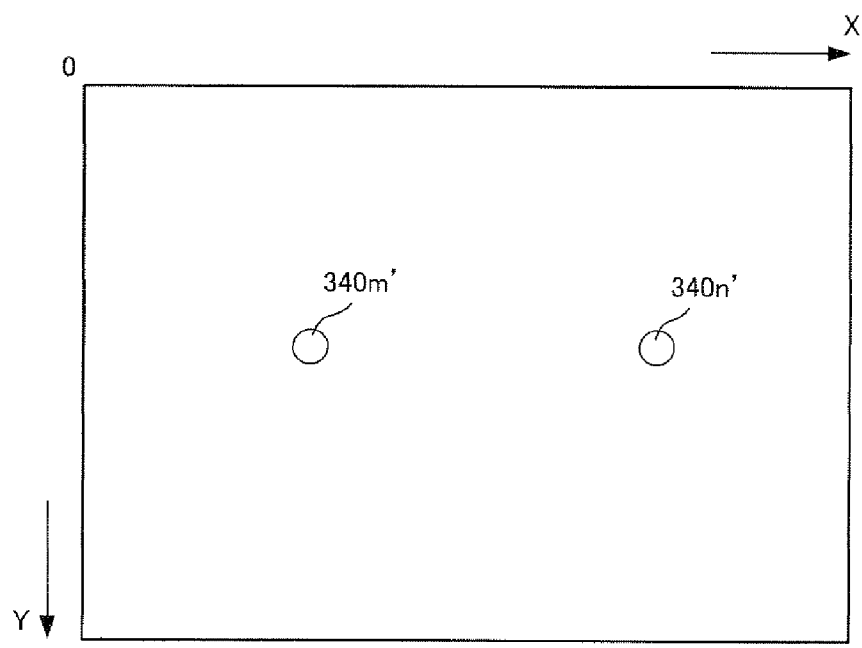
FIG. 10 is a view showing an example of a taken image including target images.

When the controller 22 is held in the operable range, an image of each of the markers 340*m* and 340*n* is taken by the imaging information calculation section 80. In other words, a taken image obtained by the image pickup element 80*c* includes the image (target image) of each of the markers 340*m* and 340*n* that are targets whose images are to be taken. FIG. 10 is a view showing an example of a taken image including target images. By using imaging data of a taken image including target images, the image processing circuit 80*d* calculates a coordinate (marker coordinate) representing the position of each of the markers 340*m* and 340*n* in the taken image.

In the imaging data of the taken image, the target images appear as regions that have a high brightness. Thus, first, the image processing circuit 80*d* detects the high brightness regions as candidates of the target images. Next, the image processing circuit 80*d* determines whether or not the high brightness regions indicate the target images, based on the sizes of the detected high brightness regions. The taken image may include images other than the target images due to sunlight incoming through a window and light from a fluorescent lamp in a room, in addition to the images 340*m*' and 340*n*' of the two markers 340*m* and 340*n* that are target images. The process of determining whether or not the high brightness regions indicate the target images is executed for distinguishing the images 340*m*' and 340*n*' of the markers 340*m* and 340*n*, which are target images, from the other images, and accurately detecting the target images. Specifically, in the determination process, whether or not the detected high brightness regions have a size in a predetermined range is determined. When the high brightness regions have a size in the predetermined range, it is determined that the high brightness regions indicate target images. When the high brightness regions do not have a size in the predetermined range, it is determined that the high brightness regions indicate images other than the target images.

Further, the image processing circuit 80*d* calculates the positions of the high brightness regions that are determined to indicate the target images as the result of the determination process. Specifically, the image processing circuit 80*d* calculates the positions of the centers of the high brightness regions. Here, the coordinates of the positions of the centers are referred to as marker coordinates. The positions of the centers can be calculated on a scale smaller than the resolution of the image pickup element 80*c*. Here, the resolution of an image taken by the image pickup element 80*d* is 126×96, and the positions of the centers are calculated on a scale of 1024×768. In other words, the coordinates of the positions of the centers are represented by integer values of (0,0) to (1024, 768).

It is noted that a position in the taken image is represented by a coordinate system (xy coordinate system) whose origin is at the upper left corner of the taken image, whose y axis positive direction is the downward direction, and whose x axis positive direction is the rightward direction.

When the target images are correctly detected, two high brightness regions are determined to indicate target images by the determination process, and thus the marker coordinates of two positions are calculated. The image processing circuit 80*d* outputs data indicative of the calculated marker coordinates of the two positions. The outputted data (marker coordinate data) of the marker coordinates is caused to be included in input data by the processor 70, and transmitted to the game apparatus 12 as described above.

When detecting the marker coordinate data from the received input data, the game apparatus 12 (CPU 40) can calculate the pointing position (pointing coordinate) of the controller 22 on the screen of the monitor 34 and the distances between the controller 22 and the markers 340*m* and 340*n* based on the marker coordinate data. Specifically, based on the position of the midpoint between the two marker coordinates, the position to which the controller 22 points, namely, the pointing position of the controller 22, is calculated. Thus, the controller 22 functions as a pointing device to point an arbitrary position on the screen of the monitor 34. Because the distance between the target images in the taken image changes in accordance with the distances between the controller 22 and the markers 340*m* and 340*n*, it is possible for the game apparatus 12 to know the distances between the controller 22 and the markers 340*m* and 340*n* by calculating the distance between the two marker coordinates.

First Example

The following will describe, as a first example, an example where a first video game is executed by the game system 10.

The first video game executed by the game system 10 in the first example and a second video game executed by the game system 10 in a later-described second example may be realized, for example, by application software (a training program) for enabling the user to do training (or take exercise) using the game system 10. In this case, the game apparatus 12 including the CPU 40 executing the training program serves as a training apparatus.

Figure 11:
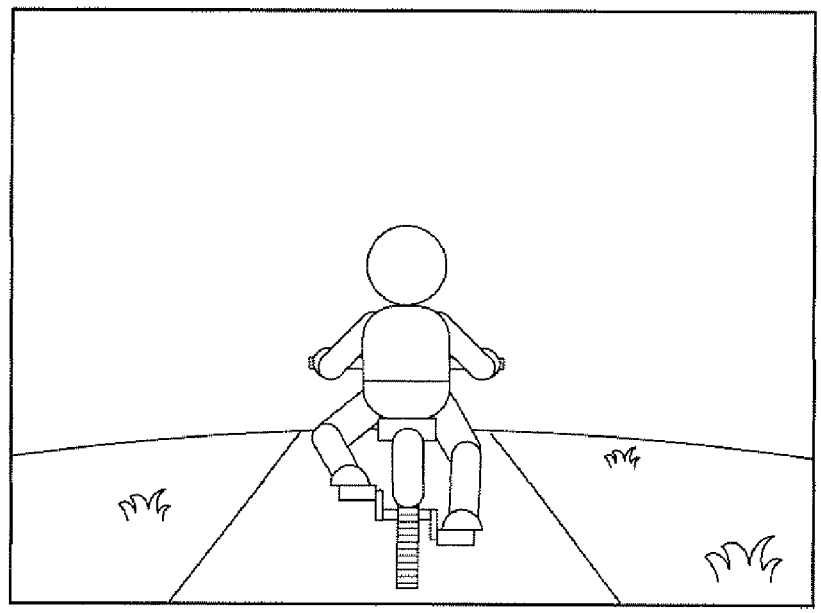
FIG. 11 illustrates an exemplary game image of a first video game.

FIG. 11 illustrates an exemplary game image displayed on the screen of the monitor 34 during execution of the first video game. In the first video game, the player holding the controller 22 stands on the load controller 36 and plays the game.

On the screen of the monitor 34, a virtual game space including a character operated by the player is displayed, and the character is riding a bicycle. When the player performs steps on the load controller 36 (i.e. alternately stands on the right foot and the left foot), the character riding the bicycle pedals in conjunction with these steps. Specifically, when the player stands on the right foot on the load controller 36 (i.e. moves their gravity center position rightward), the character pushes down the right pedal of the bicycle. When the player stands on the left foot on the load controller 36 (i.e. moves their gravity center position leftward), the character pushes down the left pedal of the bicycle. Thus, the player can operate the bicycle in the virtual game space as if actually pedaling a bicycle.

The player can change the traveling direction of the character riding the bicycle by changing the inclination angle of the controller 22 held by both hands. Thus, the player can control the traveling direction of the bicycle in the virtual game space as if operating the handlebar of a bicycle. Such control is realized by calculating the orientation of the controller 22 based on an output signal of the acceleration sensor 74 provided in the controller 22. Specifically, the traveling direction of the bicycle in the virtual game space is controlled such that, when the player holds the controller 22 such that the longitudinal direction of the controller 22 is parallel to the horizontal line, the bicycle in the virtual game space moves forward. The traveling direction of the bicycle in the virtual game space is also controlled such that, when the angle between the longitudinal direction of the controller 22 and the horizontal line is greater, the bicycle in the virtual game space turns so as to draw a smaller circle (i.e. such that the curvature of the path of the bicycle is greater). The inclination of the longitudinal direction of the controller 22 with respect to the horizontal line can be determined, for example, based on acceleration detected by the acceleration sensor 74 provided in the controller 22. For example, when the controller 22 is held such that the longitudinal direction of the controller 22 is parallel to the horizontal line, a value of acceleration data in the longitudinal direction of the controller 22 (i.e. the value of the acceleration az along the aforementioned z axis) becomes 0. The greater the angle between the longitudinal direction of the controller 22 and the horizontal line is, the greater the absolute value of the value of the acceleration data in the longitudinal direction of the controller 22 is due to influence of the gravitational acceleration. Further, the turning direction (right turn or left turn) of the bicycle in the virtual game space is determined by the sign of the value of the acceleration data in the longitudinal direction and the controller 22.

The following will describe in detail a method of controlling pedaling motion of the character based on signals from the load controller 36. It is noted that a method of controlling the traveling direction of the bicycle based on signals from the controller 22 is not particularly relevant to the present invention, and thus the detailed description thereof will be omitted.

Figure 12:
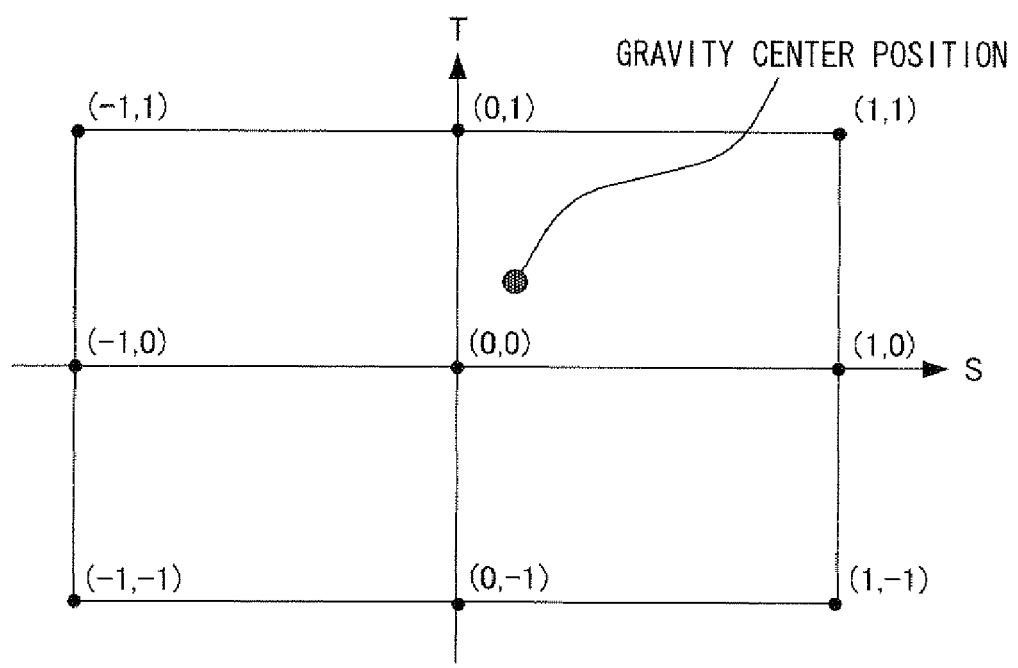
FIG. 12 illustrates an example of a gravity center position calculated based on signals from the load controller.

FIG. 12 illustrates an example of a gravity center position calculated based on signals from the load controller 36. The gravity center position of the player is represented by an S coordinate value and a T coordinate value. The origin of an ST coordinate space corresponds to the center of the stand 36a of the load controller 36. Further, an S axis positive direction corresponds to the direction from the left edge of the load controller 36 (the edge on the left side when viewed from the player standing behind the load controller 36 so as to face the long side on which the power button 36c is provided) toward the right edge of the load controller 36, and a T axis positive direction corresponds to the direction from the rear edge toward the front edge of the load controller 36.

The above gravity center position of the player is calculated based on four load values detected by the four load sensors 36b provided in the load controller 36. Specifically, on the assumption that the player stands on the stand 36a of the load controller 36 such that the power button 36c is positioned behind the player, the S coordinate (s0) and the T coordinate (t0) of the gravity center are calculated by the following mathematical formulas, respectively, where: a denotes the load value of the load sensor 36b positioned on the right rear side of the player; b denotes the load value of the load sensor 36b positioned on the left rear side of the player; c denotes the load value of the load sensor 36b positioned on the right front side of the player; and d denotes the load value of the load sensor 36b positioned on the left front side of the player.

$$s0=((a+c)-(b+d))*m$$

$$t0=((c+d)-(a+b))*n$$

Here, m and n are constants, and s0 and t0 satisfy that $-1 \leq s0 \leq 1$ and $-1 \leq t0 \leq 1$, respectively. As described above, s0 is calculated based on the difference between the sum of the load values of the two load sensors 36b positioned on the left side of the player and the sum of the load values of the two load sensors 36b positioned on the right side of the player. Similarly, g0 is calculated based on the difference between the sum of the load values of the two load sensors 36b positioned on the front side of the player and the sum of the load values of the two load sensors 36b positioned on the rear side of the player.

With reference to FIGS. 13 to 20, the following will describe an input determination process based on the gravity center position of the player.

The control of the pedaling motion of the character based on signals from the load controller 36 is performed by using only the S coordinate value (s0) of the gravity center position of the player detected as described above.

Figure 13:
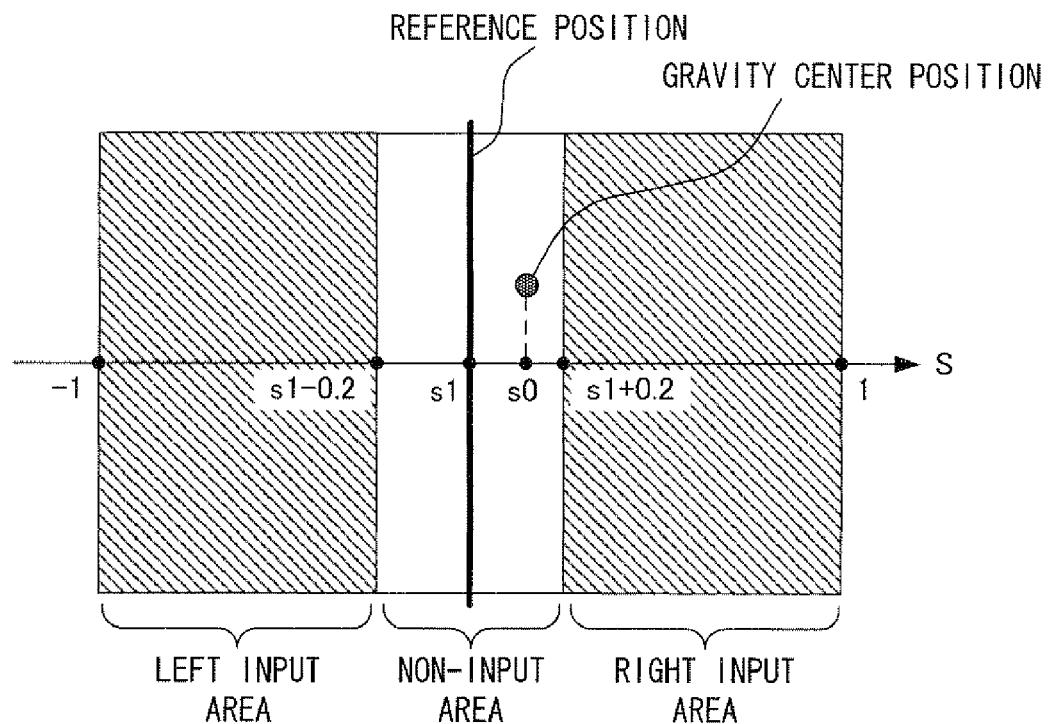
FIG. 13 is a view showing a method of updating a reference position during execution of the first video game.

As shown in FIG. 13, a reference position is set in the ST coordinate space. The reference position is a position such that, when the gravity center position of the player is located at this position, it is determined that the player has not intentionally moved their gravity center. In other words, when the gravity center position of the player agrees with the reference position, it is determined that the player has not intentionally moved their gravity center. On the other hand, when the gravity center position of the player is positioned off the reference position, it is determined that the player has intentionally moved their gravity center. Here, the reference position is represented by only an S coordinate value (s1). The initial value for the reference position (i.e. s1) is 0, but the reference position is sequentially updated in accordance with the gravity center position of the player detected sequentially while the player plays the first video game. An update process of the reference position will be described in detail later.

In the ST coordinate space, a right input area, a left input area, and a non-input area are set based on the reference position. The boundary between the right input area and the non-input area is moved in conjunction with the reference position, and its S coordinate value is s1+0.2. The boundary between the left input area and the non-input area is also moved in conjunction with the reference position, and its S coordinate value is s1−0.2.

When the gravity center position enters the right input area, the character in the virtual game space pushes down the right pedal of the bicycle accordingly. When the gravity center position enters the left input area, the character in the virtual game space pushes down the left pedal of the bicycle accordingly. In the first video game, similarly to an operation of a bicycle in the real world, the character in the virtual game space is limited not to push down the same pedal (the right pedal or the left pedal) successively two times or more. Thus, in order for the bicycle in the virtual game space to move, the player needs to cause their gravity center position to alternately enter the right input area and the left input area.

The following will describe an update process of the reference position in accordance with movement of the gravity center position of the player in the first example.

While the gravity center position is located in the non-input area as shown in FIG. 13 after the game is started, the reference position is not moved.

Figure 14:
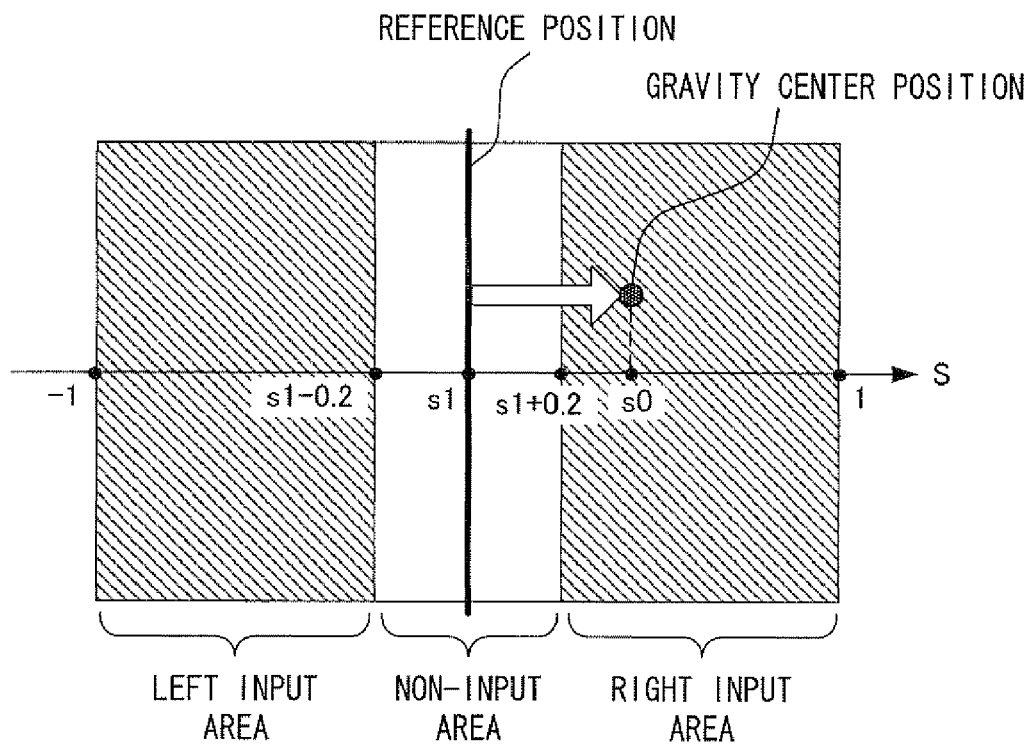
FIG. 14 is a view showing the method of updating the reference position during execution of the first video game.
Figure 15:
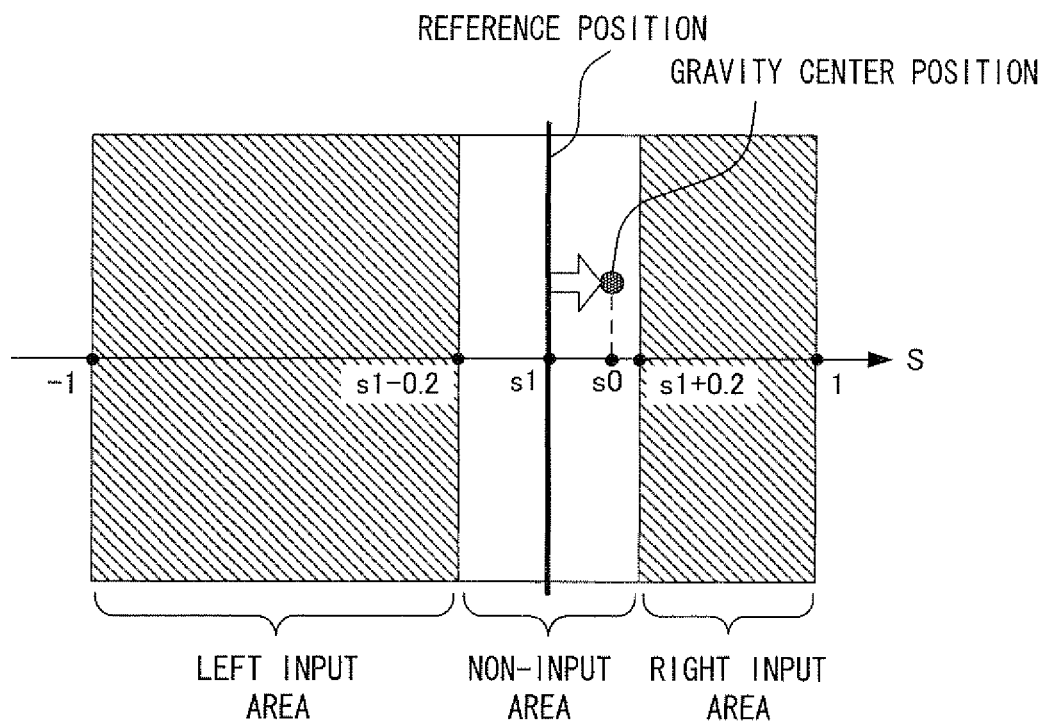
FIG. 15 is a view showing the method of updating the reference position during execution of the first video game.
Figure 16:
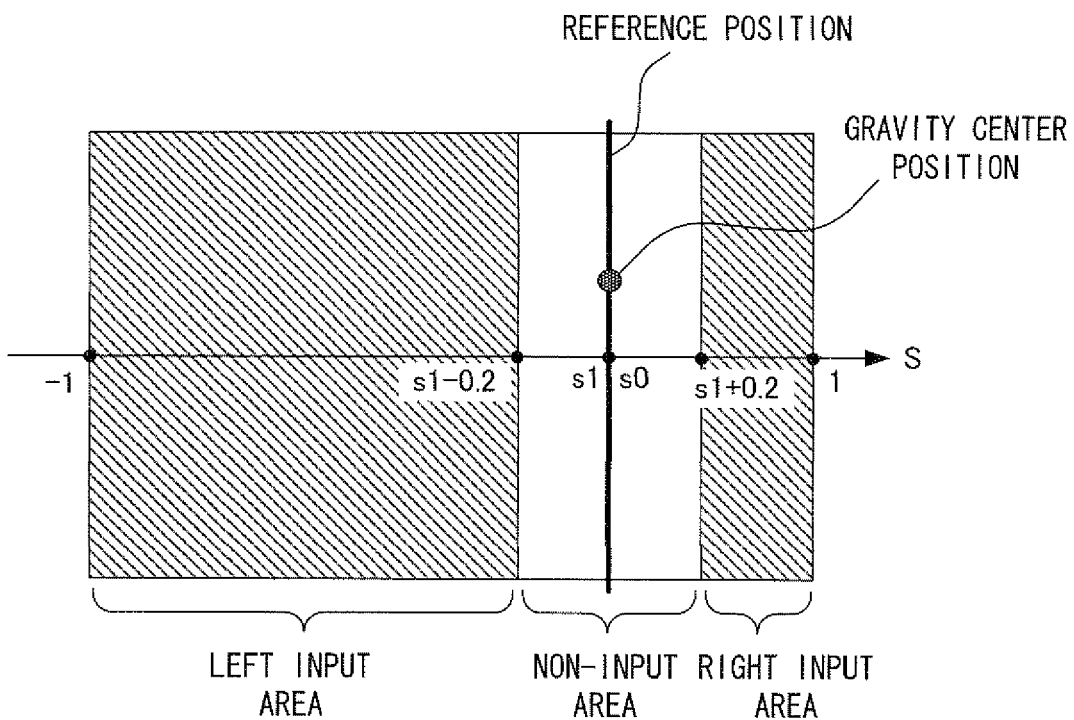
FIG. 16 is a view showing the method of updating the reference position during execution of the first video game.

When the gravity center position enters the right input area or the left input area, the reference position is moved so as to approach the gravity center position. For example, when the gravity center position enters the right input area as shown in FIG. 14, the character in the virtual game space pushes down the right pedal of the bicycle, and the reference position is moved toward the gravity center position. It is noted that the reference position is not moved instantaneously toward the gravity center position, but is moved toward the gravity center position in a phased manner so as to gradually approach the gravity center position as described later. FIGS. 15 and 16 shows a state where the reference position gradually approaches the gravity center position from the state of FIG. 14.

In the state of FIG. 15, as a result of approach of the reference position to the gravity center position, the gravity center position is moved off the right input area and located in the non-input area. In the first example, basically, when the gravity center position enters one of the right input area and the left input area, the reference position is controlled so as to approach the gravity center position until the gravity center position enters the other area. Thus, in the state of FIG. 15, the reference position continues to gradually approach the gravity center position because the gravity center position has not entered the left input area. Then, as shown in FIG. 16, the reference position finally reaches the gravity center position.

Figure 17:
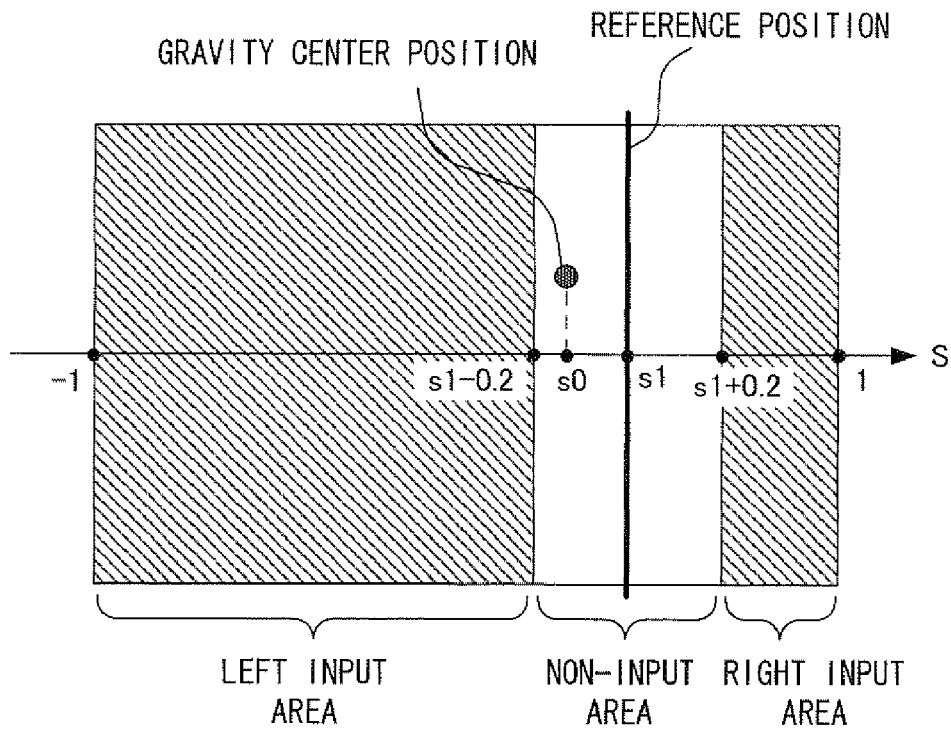
FIG. 17 is a view showing the method of updating the reference position during execution of the first video game.

FIG. 17 shows a state where the gravity center moves slightly leftward (in the S axis negative direction) from the state of FIG. 16. In this state, the gravity center posit-on is located in the non-input area. As described above, in the first example, "basically", when the gravity center position enters one of the right input area and the left input area, the reference position is controlled so as to approach the gravity center position until the gravity center position enters the other area. However, if the reference position is moved to approach the gravity center position in the state of FIG. 17, the boundary between the left input area and the non-input area is moved away from the gravity center position accordingly. This makes it difficult for the player to cause the gravity center position to enter the left input area. In order to avoid such a problem, in the first example, during a period after the gravity center position enters the right input area until the gravity center position enters the left input area, the reference position is controlled so as to approach the gravity center position "only when the gravity center position is located on the right side (S axis positive direction side) of the reference position". Similarly, during a period after the gravity center position enters the left input area until the gravity center position enters the right input area, the gravity center position is controlled so as to approach the gravity center position "only when the gravity center position is located on the left side (S axis negative direction side) of the reference position". Thus, in the state of FIG. 17, the reference position does not approach the gravity center position, and the boundary between the left input area and the non-input area is not moved away from the gravity center position.

Figure 18:
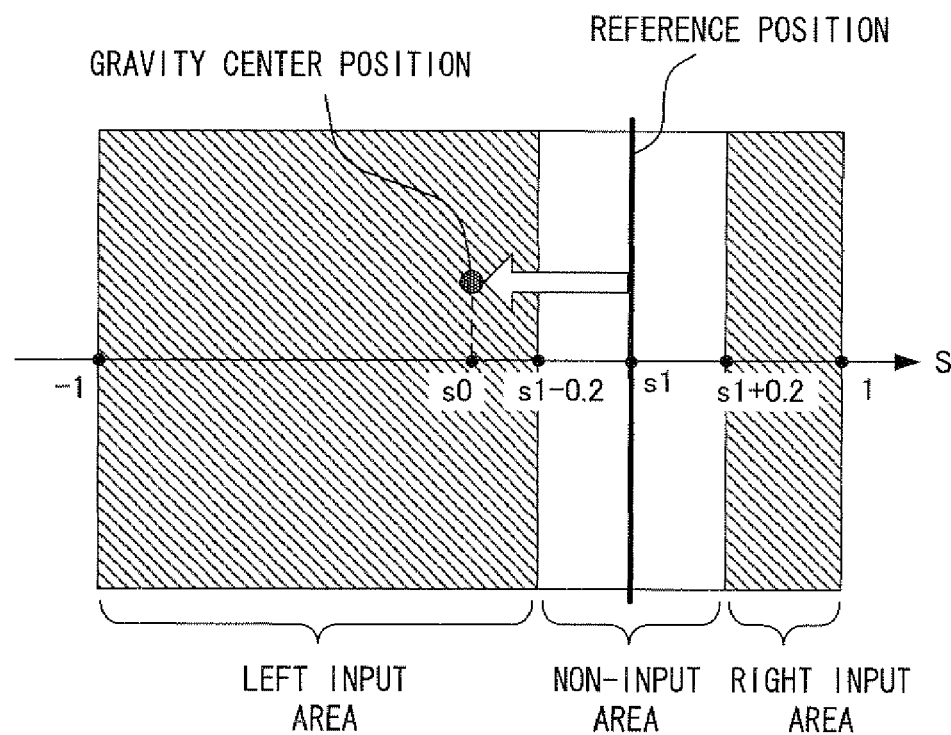
FIG. 18 is a view showing the method of updating the reference position during execution of the first video game.
Figure 19:
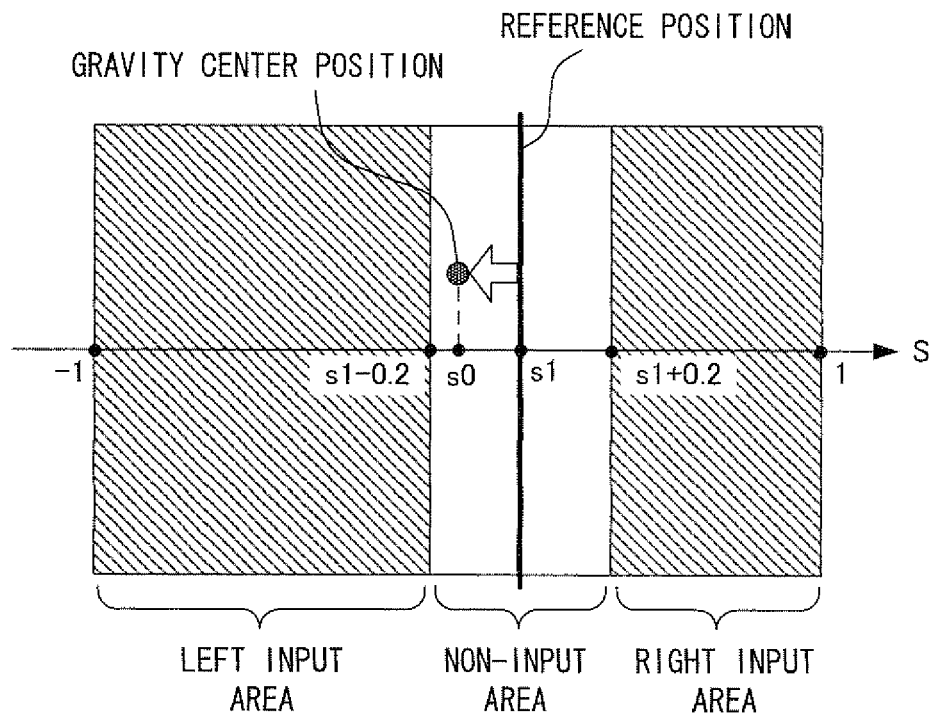
FIG. 19 is a view showing the method of updating the reference position during execution of the first video game.
Figure 20:
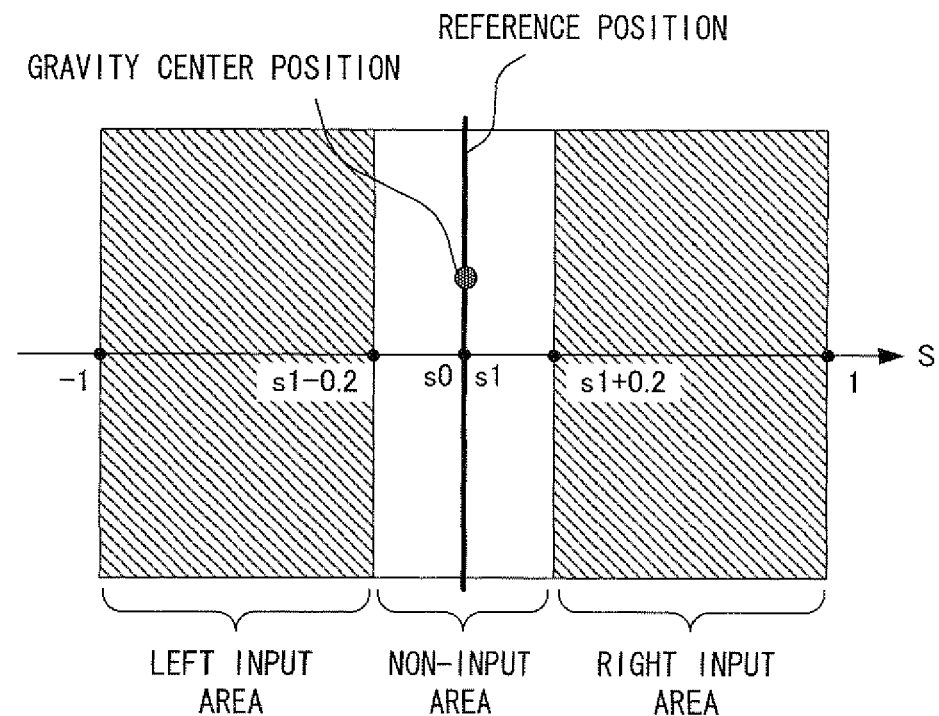
FIG. 20 is a view showing the method of updating the reference position during execution of the first video game.

When the gravity center position moves leftward (in the S axis negative direction) further from the state of FIG. 17 and enters the left input area as shown in FIG. 18, the character in the virtual game space pushes down the left pedal of the bicycle, and the reference position is moved gradually toward the gravity center position. FIGS. 19 and 20 show a state where the reference position gradually approaches the gravity center position from the state of FIG. 18.

In the state of FIG. 19, as a result of approach of the reference position to the gravity center position, the gravity center position is moved off the right input area and located in the non-input area. In this state, after entering the left input area, the gravity center position has not entered the right input area. Thus, the reference position continues to gradually approach the gravity center position. Then, as shown in FIG. 20, the reference position finally reaches the gravity center position.

According to the update process of the reference position as described above, after the gravity center position enters the right input area, the reference position approaches the gravity center positions and the boundary between the left input area and the non-input area approaches the gravity center position in conjunction with the reference position. Thus, a movement distance of the gravity center that is required for the player to cause the gravity center position to enter the left input area after the gravity center position enters the right input area, is shortened, and thus it is possible for the player to more quickly perform an instruction for another process and responsiveness improves. The same applies to the case where the player causes the gravity center position to enter the right input area after causing the gravity center position to enter the left input area.

Further, even when the gravity centers of players are positioned eccentrically (i.e. even when the gravity center of a player tends to be positioned eccentrically on the right side and the gravity center of another player tends to be positioned eccentrically on the left side), the reference position is sequentially updated so as to approach the gravity center position, and hence such a problem of the eccentric position of the gravity center of each player is eliminated and operational feeling comfortable for every player is obtained.

Further, during playing of the video game, even when the player unintentionally moves their gravity center position from the intended position (e.g. even when the player believes that the player performs steps at the center of the stand 36a of the load controller 36 but the gravity center position is actually gradually moved away from the center of the stand 36a, or even when the player moves the controller 22, held by both hands, rightward away from their body and unintentionally moves their gravity center position rightward because the player attempts to turn the bicycle in the virtual game space in the right direction to the limit), the reference position can be sequentially updated to be a more appropriate position.

The following will describe a procedure of processing executed by the CPU 40 of the game apparatus 12 in the first example.

FIG. 21 shows an example of a computer program and data that are stored in the external main memory 46 in the first example. It is noted that the internal main memory 42e or another memory may be used instead of the external main memory 46.

An information processing program 90 is a computer program that is composed of a plurality of program codes for causing the CPU 40 to execute the first video game. Prior to execution of the first video game, the information processing program 90 is loaded from a computer-readable storage medium such as the optical disc 18 and the Flash memory 44 and stored in the external main memory 46. It is noted that the information processing program 90 may be supplied to the game apparatus 12 from another computer system (e.g. a game program distribution server, and another game apparatus) via the wireless communication module 50 and the like.

A gravity center position 91 is two-dimensional coordinate data (s0, t0) indicative of the gravity center position of the player on the stand 36a of the load controller 36. It is noted that the gravity center position 91 is not necessarily two-dimensional coordinate data, and when only the S coordinate value of the gravity center position is used in the information processing program 90, only the S coordinate value may be stored as the gravity center position 91 in the external main memory 46.

A reference position 92 is data (s1) indicative of the S coordinate value of the reference position.

A right input flag 93 is a flag that is set to be ON when the gravity center position enters the right input area, and that is set to be OFF when the gravity center position enters the left input area.

A left Input flag 94 is a flag that is set to be ON when the gravity center position enters the left input area, and that is set to be OFF when the gravity center position enters the right input area.

Figure 22:
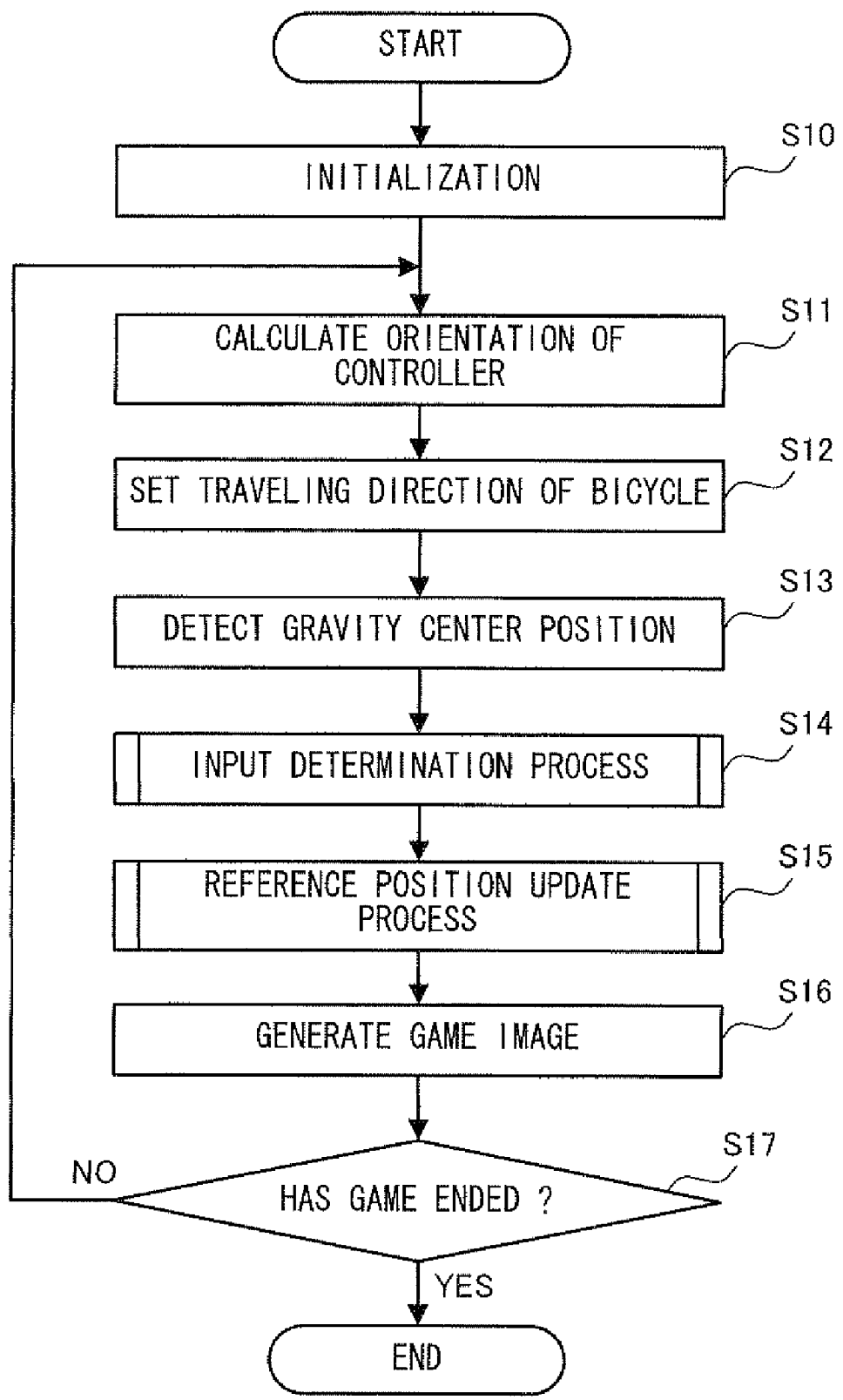
FIG. 22 is a flowchart showing a procedure of processing executed by a CPU during execution of the first video game.
Figure 23:
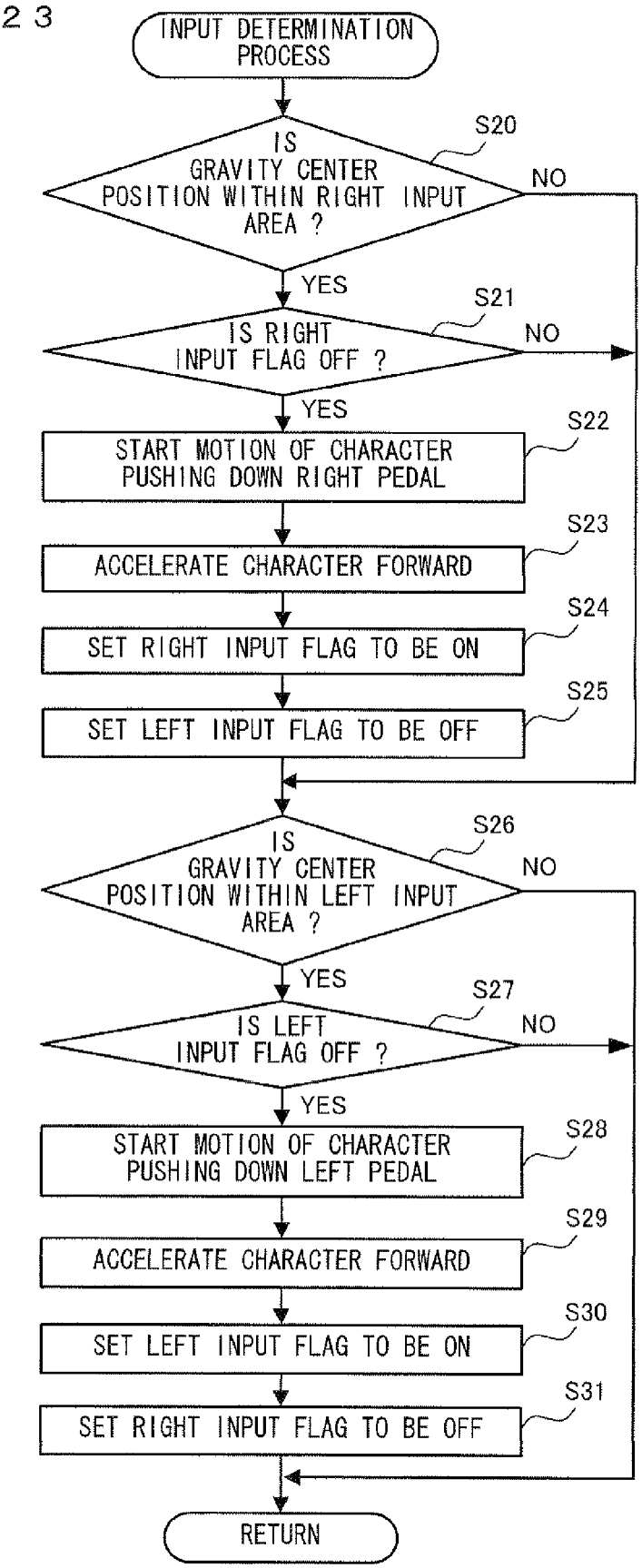
FIG. 23 is a flow chart showing in detail an input determination process during execution of the first video game.
Figure 24:
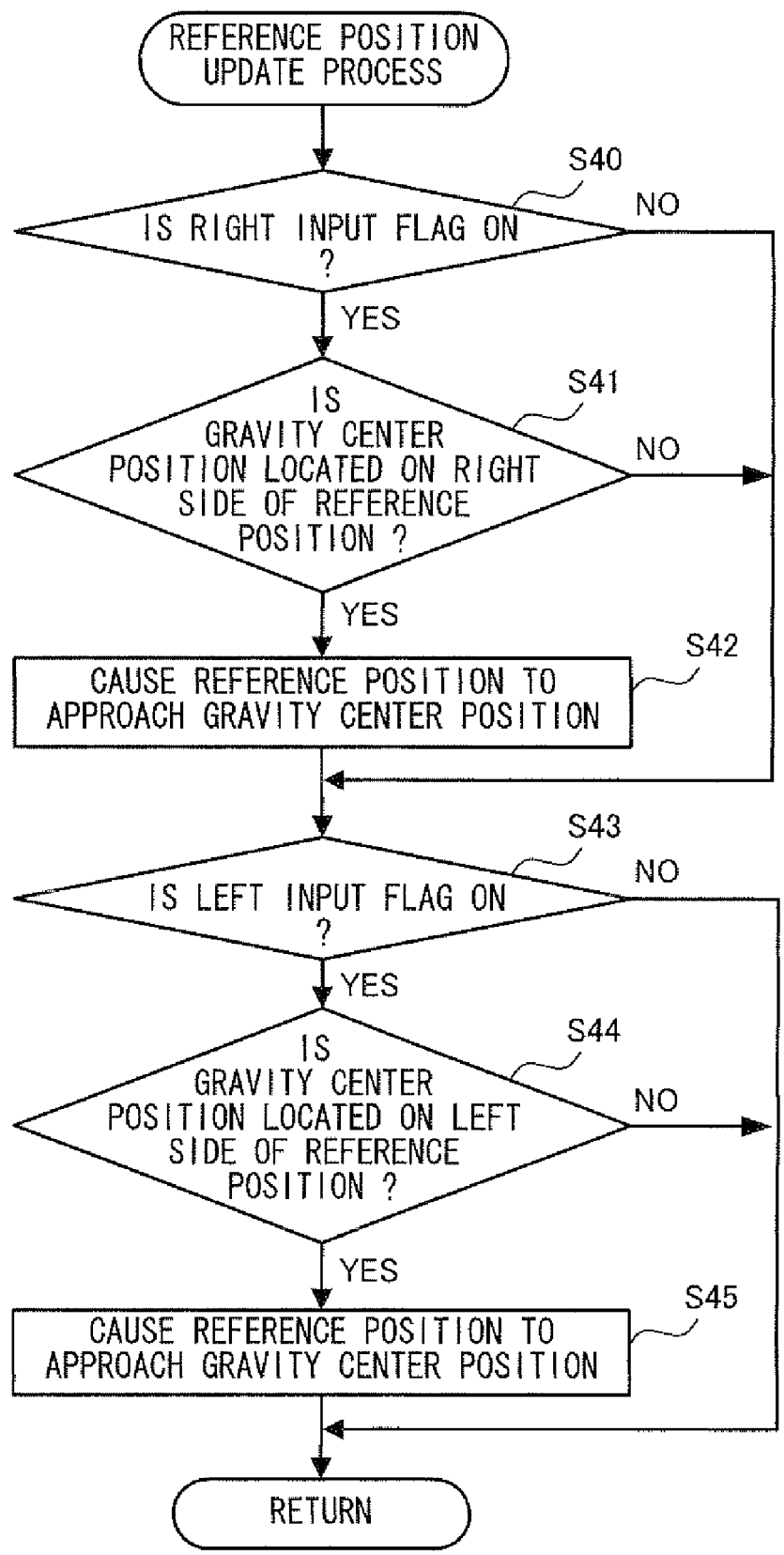
FIG. 24 is a flow chart showing in detail a reference position update process during execution of the first video game.

With reference to the flow charts in FIGS. 22 to 24, the following will describe a procedure of processing executed by the CPU 40 based on the information processing program 90.

When execution of the information processing program 90 is started, the CPU 40 executes an initialization process at step S10 in FIG. 22. The initialization process includes a process of setting the reference position 92 to an initial value "0", a process of setting the right input flag 93 and the left input flag 94 to be OFF, and the like.

At step S11, the CPU 40 calculates the orientation of the controller 22. Specifically, the CPU 40 calculates the orientation of the controller 22 (e.g. the inclination of the longitudinal direction of the controller 22 with respect to the horizontal line) based on the acceleration data detected by the acceleration sensor 74 of the controller 22.

At step S12, the CPU 40 sets the traveling direction of the bicycle in the virtual game space, in accordance with the orientation of the controller 22 that is calculated at step S11.

At step S13, the CPU 40 detects the gravity center position of the player. Specifically, the CPU 40 calculates, based on a signal from the load controller 36, the gravity center position from load values of the four load sensors 36b that are contained in the signal, and updates the gravity center position 91 stored in the external main memory 46.

At step S14, the CPU 40 executes an input determination process. The input determination process is a process of determining whether or not the gravity center position has entered the right input area or the left input area and of controlling motion and the like of the character in the virtual game space in accordance with the result of the determination. The input determination process will be described in detail later.

At step S15, the CPU 40 executes a reference position update process. The reference position update process is a process of updating, in accordance with the gravity center position detected at the step S13, the reference position 92 stored in the external main memory 46. The reference position update process will be described in detail later.

At step S16, the CPU 40 generates a game image in which the control result of the motion and the like of the character at step S14 is reflected, and outputs, to the monitor 34, video signals corresponding to this game image. At this event, the CPU 40 may generate an image (e.g. the image shown in FIG. 13 or the like) showing the current gravity center position and the current reference position, and may superimpose or combine (translucently display) this image at a predetermined region (e.g. a right upper region) of the game image. Whereby, a state where the reference position changes moment by moment can be displayed to the player.

At step S17, the CPU 40 determines whether or not the game has ended. When the game has ended, the CPU 40 ends the execution of the information processing program 90. When the game continues, the CPU 40 returns to step S11.

While the game continues, the CPU 40 repeats the processes at steps S11 to S17 at a predetermined cycle (e.g. every 1/60 sec).

With reference to FIG. 23, the following will describe in detail the input determination process at step S14 in FIG. 22.

When the input determination process is started, at step S20, the CPU 40 refers to the gravity center position 91 and the reference position 92 that are stored in the external main memory 46, and determines whether or not the gravity center position is located within the right input area. Specifically, this determination is performed by comparing the magnitude of s0 with the magnitude of s1+0.2. Then, when it is determined that the gravity center position is located within the right input area, the CPU 40 proceeds to step S21. When it is determined that the gravity center position is not located within the right input area, the CPU 40 proceeds to step S26.

At step S21, the CPU 40 determines whether or not the right input flag 93 is OFF. When the right input flag 93 is OFF, the CPU 40 proceeds to step 322. When the right input flag 93 is not OFF, the CPU 40 proceeds to step S26.

At step S22, the CPU 40 starts a motion of the character in the virtual game space pushing down the right pedal of the bicycle.

At step S23, the CPU 40 accelerates the character in the virtual game space together with the bicycle. It is noted that she acceleration direction at this time is set based on the orientation of the controller 22 held by the player.

At step S24, the CPU 40 sets the right input flag 93 to be ON.

At step S25, the CPU 40 sets the left input flag 94 to be OFF.

At step S26, the CPU 40 refers to the gravity center position 91 and the reference position 92 that are stored in the external main memory 46, and determines whether or not the gravity center position is located within the Left input area. Specifically, this determination is performed by comparing the magnitude of s0 with the magnitude of s1−0.2. Then, when it is determined that the gravity center position is located within the left input area, the CPU 40 proceeds to step S27. When it is determined that the gravity center position is not located within the left input area, the CPU 40 ends the input determination process.

At step S27, the CPU 40 determines whether or not the left input flag 94 is OFF. When the Left input flag 94 is OFF, the CPU 40 proceeds to step 228. When the left input flag 94 is not OFF, the CPU 40 ends the input determination process.

At step S28, the CPU 40 starts a motion of the character in the virtual game space pushing down the left pedal of the bicycle.

At step S29, the CPU 40 accelerates the character in the virtual game space together with the bicycle. It is noted that the acceleration direction at this time is set based on the traveling direction of the bicycle that is set at the above step S12.

At step S30, the CPU 40 sets the left input flag 94 to be ON.

At step S31, the CPU 40 sets the right input flag 93 to be OFF. Then, the CPU 40 ends the input determination process.

With reference to FIG. 24, the following will describe in detail the reference position update process at step S15 in FIG. 22.

When the reference position update process is started, at step S40, the CPU 40 determines whether or not the right input flag 93 is ON. When the right input flag 93 is ON, the CPU 40 proceeds to step S41. When the right input flag 93 is not ON, the CPU 40 proceeds to step S43.

At step S41, the CPU 40 refers to the gravity center position 91 and the reference position 92 that are stored in the external main memory 46, and determines whether or not the gravity center position is located on the right side (i.e. on the S axis positive direction side) of the reference position. Specifically, this determination is performed by comparing the magnitude of s0 with the magnitude of s1. When it is determined that the gravity center position is located on the right side of the reference position, the CPU 40 proceeds to step S42. When it is determined that the gravity center position is not located on the right side of the reference position, the CPU 40 proceeds to step S43.

Figure 25:
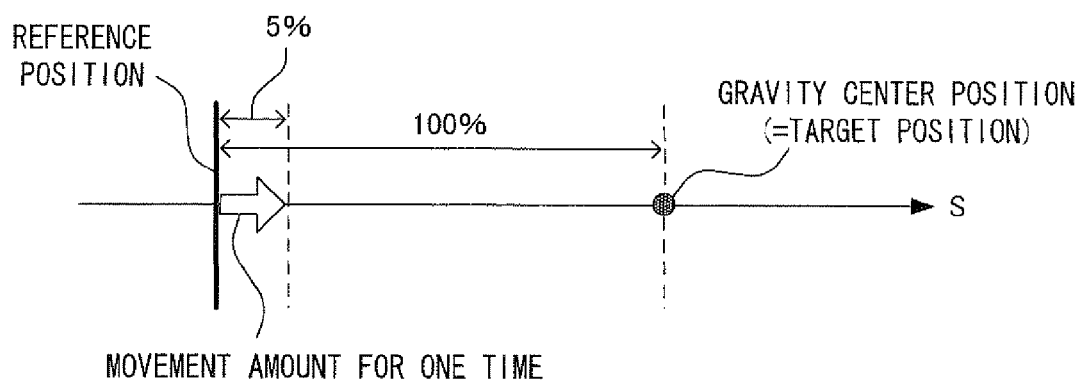
FIG. 25 is a view showing a movement amount of the reference position during execution of the first video game.

At step S42, the CPU 40 updates the reference position 92 stored in the external main memory 46, such that the reference position approaches the gravity center position. Specifically, as shown in FIG. 25, the reference position is caused to approach the gravity center position by the distance equivalent to 5% of the distance from the current reference position to the gravity center position. Thus, when the current reference position is represented by s1, an after-update reference position is represented by s1+((s0−s1)*0.05).

At step S43, the CPU 40 determines whether or not the left input flag 94 is ON. When the left input flag 94 is ON, the CPU 40 proceeds to step 344. When the left input flag 94 is not ON, the CPU 40 ends the reference position update process.

At step S44, the CPU 40 refers to the gravity center position 91 and the reference position 92 that are stored in the external main memory 46, and determines whether or not the gravity center position is located on the left side (i.e. on the S axis negative direction side) of the reference position. Specifically, this determination is performed by comparing the magnitude of s0 with the magnitude of s1. When it is determined that the gravity center position is located on the left side of the reference position, the CPU 40 proceeds to step S45. When it is determined that the gravity center position is not located on the left side of the reference position, the CPU 40 ends the reference position update process.

At step S45, the CPU 40 updates the reference position 92 stored in the external main memory 46, such that the reference position approaches the gravity center position. Specifically, the reference position is caused to approach the gravity center position by the distance equivalent to 5% of the distance from the current reference position to the gravity center position. Thus, when the current reference position is represented by s1, an after-update reference position is represented by s1+((s1−s0)*0.05). Then, the CPU 40 ends the input determination process.

By the processing executed by the CPU 40 as described above, the update process of the reference position as described with reference to FIGS. 13 to 20 is realized.

It is noted that the flow charts in FIGS. 22 to 24 are merely one example, and as long as the same result is obtained, the CPU 40 may be operated in accordance with a flowchart different from these flow charts.

Further, the aforementioned various constants ("0.2" in FIG. 13, "5%" in FIG. 25, and the like) are merely one example, and other values may be used according to need.

Second Example

The following will describe, as a second example, an example where a second video game is executed by the game system 10.

Figure 26:
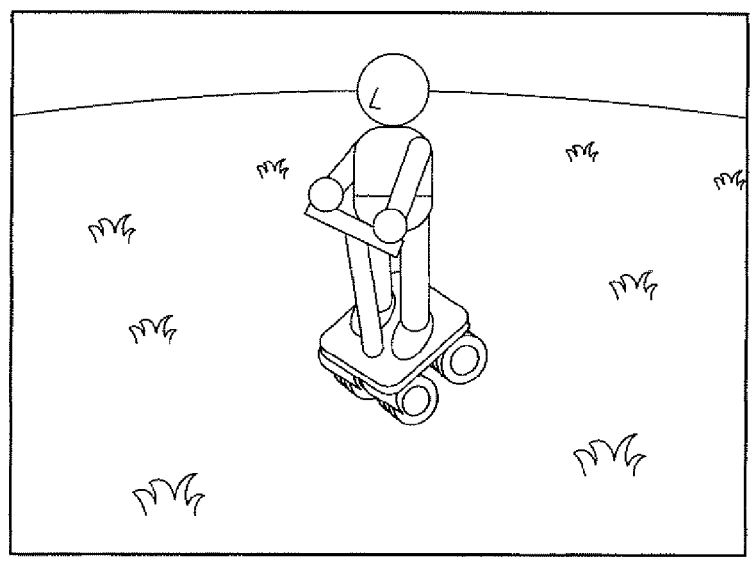
FIG. 26 illustrates an exemplary game image of a second video game.

FIG. 26 illustrates a game image displayed on the screen of the monitor 34 during execution of the second video game. In the second video game, the player holding the controller 22 stands on the load controller 36 and plays the game.

On the screen of the monitor 34, a virtual game space including a character operated by the player is displayed, and the character is riding an imaginary vehicle. When the player moves their gravity center forward on the load controller 36, the vehicle carrying the character accelerates in the forward direction. When the player moves their gravity center rearward on the load controller 36, the vehicle carrying the character accelerates in the rearward direction. At this time, when the player moves their gravity center forward on the load controller 36 more, the vehicle more greatly accelerates in the forward direction. When the player moves their gravity center rearward on the load controller 36 more, the vehicle more greatly accelerates in the rearward direction.

Further, the player can change the traveling direction of the vehicle by changing the inclination angle of the controller 22 held by both hands.

The following will describe in detail a method of controlling movement of the vehicle based on signals from the load controller 36. It is noted that a method of controlling the traveling direction of the vehicle based on signals from the controller 22 is not particularly relevant to the present invention, and thus the detailed description thereof will be omitted.

With reference to FIGS. 27 to 31, the following will describe an input determination process based on the gravity center position of the player.

The control of movement of the vehicle based on signals from the load controller 36 is performed by using only the T coordinate value (t0) of the gravity center position of the player detected as described above.

Figure 27:
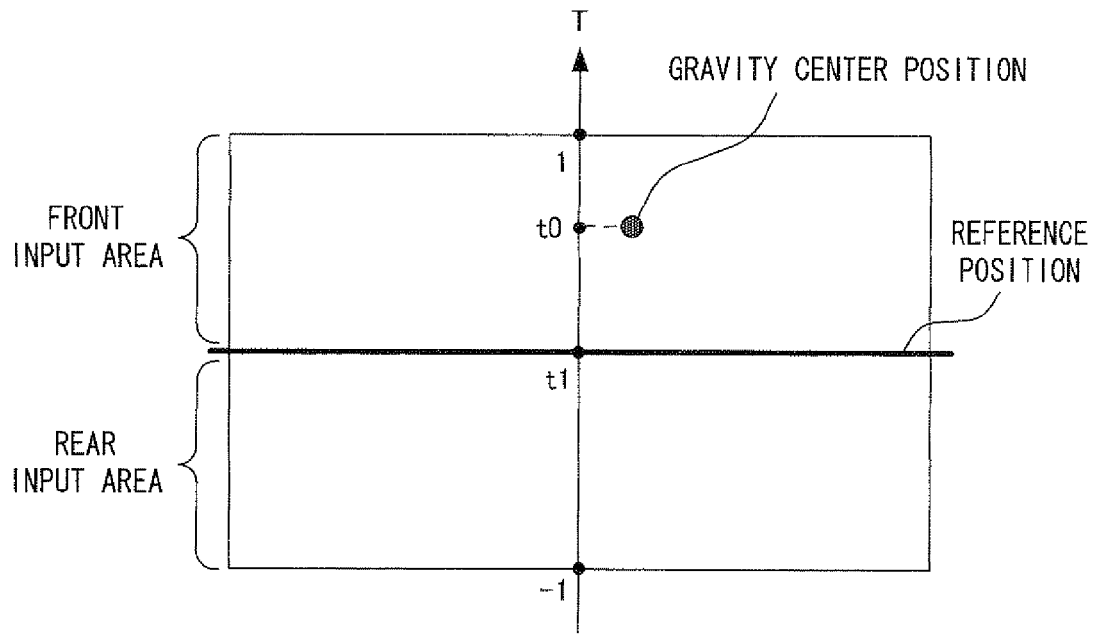
FIG. 27 is a view showing a method of updating a reference position during execution of the second video game.

As shown in FIG. 27, in the ST coordinate space, a reference position is set. Here, the reference position is represented by only a T coordinate value (t1). The initial value for the reference position (i.e. t1) is 0, but the reference position is sequentially updated in accordance with the gravity center position of the player detected sequentially while the player plays the second video game. An update process of the reference position will be described in detail later.

In the ST coordinate space, a front input area and a rear input area are set based on the reference position. The boundary between the front input area and the rear input area always agrees with the reference position. Thus, when the reference position is moved, the boundary between the front input area and the rear input area is also moved in conjunction with the reference position.

When the gravity center position enters the front input area, the vehicle carrying the character in the virtual game space accelerates in the forward direction accordingly. The magnitude of the acceleration at this time is changed in accordance with the distance between the gravity center position and the reference position (i.e. the absolute value of (t0−t1)). When the distance between the gravity center position and the reference position is greater, the vehicle more greatly accelerates in the forward direction. Further, when the gravity center position enters the rear input area, the vehicle carrying the character in the virtual game space accelerates in the rearward direction accordingly. The magnitude of the acceleration at this time is also changed in accordance with the distance between the gravity center position and the reference position (i.e. the absolute value of (t0−t1)). When the distance between the gravity center position and the reference position is greater, the vehicle more greatly accelerates in the rearward direction.

The following will describe an update process of the reference position in accordance with movement of the gravity center position of the player in the second example.

Figure 28:
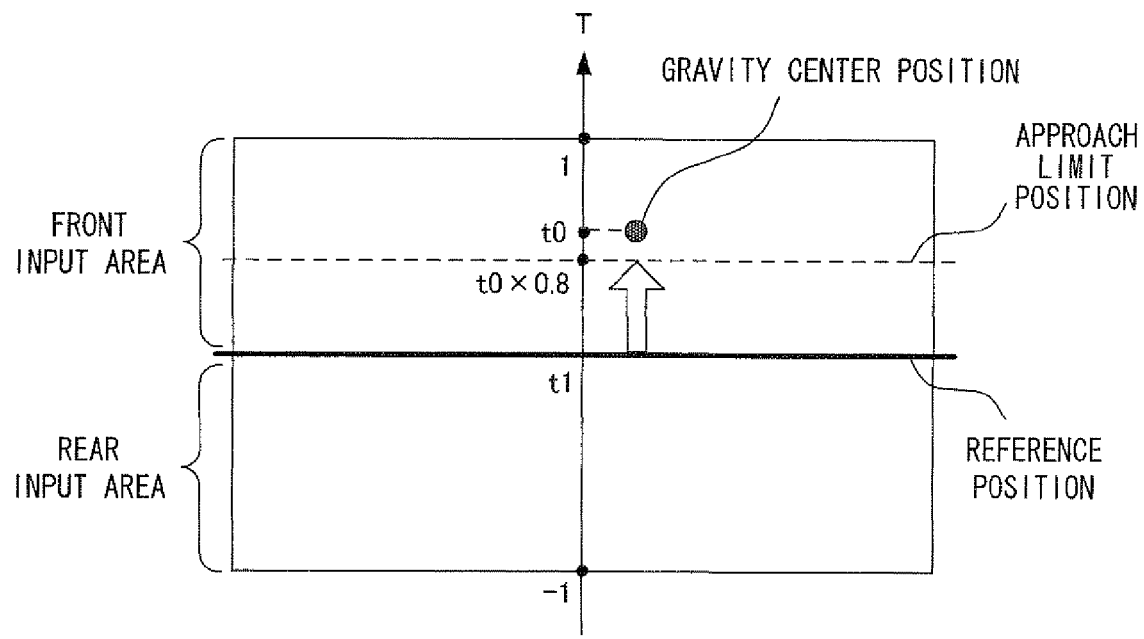
FIG. 28 is a view showing the method of updating the reference position during execution of the second video game.
Figure 29:
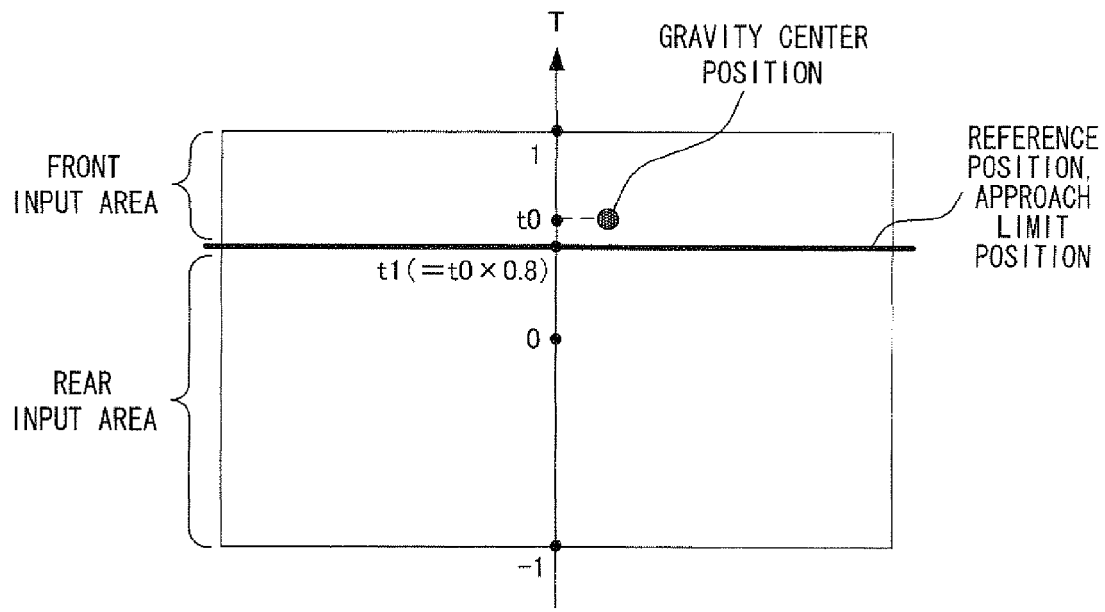
FIG. 29 is a view showing the method of updating the reference position during execution of the second video game.

When the gravity center position enters the front input area or the rear input areas the reference position is moved so as to approach the gravity center position. For example, as shown in FIG. 28, when the gravity center position enters the front input area, the vehicle carrying the character in the virtual game space accelerates in the forward direction, and the reference position is moved toward the gravity center position. However, there is a problem that, when the reference position finally is moved to the gravity center position as in the first example, the magnitude of a force applied in the forward direction to the vehicle finally becomes 0, and the player cannot continue to accelerate the vehicle in the forward direction. In order to avoid such a problem, in the second example, the reference position is controlled so as to approach the gravity center position with "a predetermined approach limit position as a limit". Specifically, as shown in FIG. 28, the position represented by the T coordinate value of t0*0.8 is set as the approach limit position, and the reference position is moved toward the approach limit position in a phased manner so as to gradually approach the approach limit position. Then, as shown in FIG. 29, the reference position finally reaches the approach limit position, and does not approach the gravity center position any more. Thus, the player can continuously accelerate the vehicle in the forward direction at an acceleration of a magnitude in accordance with the distance between the gravity center position and the reference position (i.e. t0*0.2) at this time.

Figure 30:
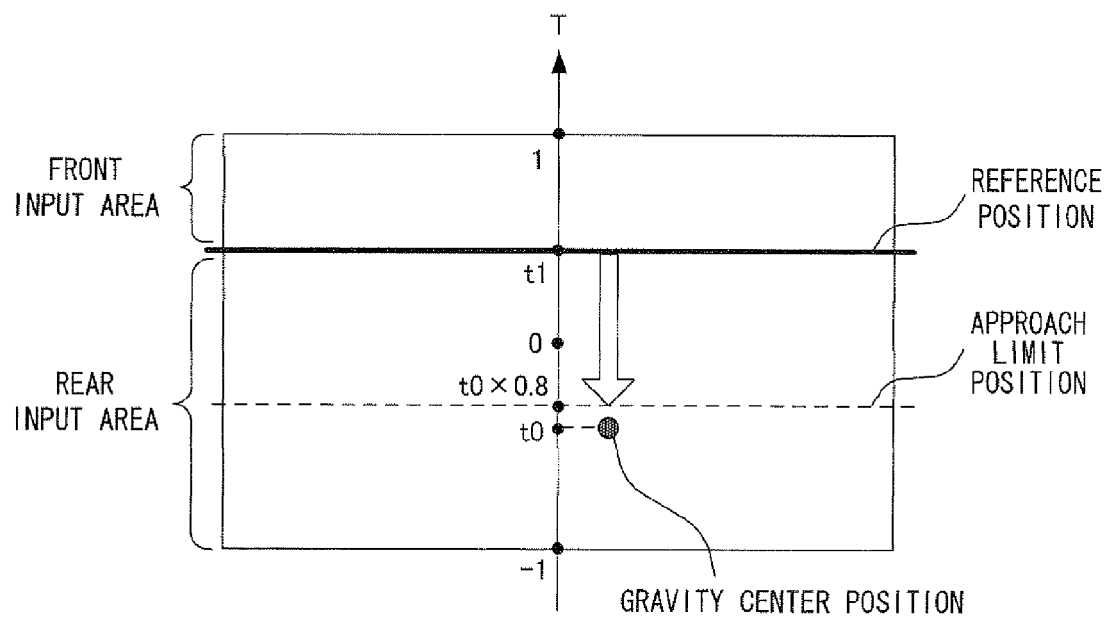
FIG. 30 is a view showing the method of updating the reference position during execution of the second video game.
Figure 31:
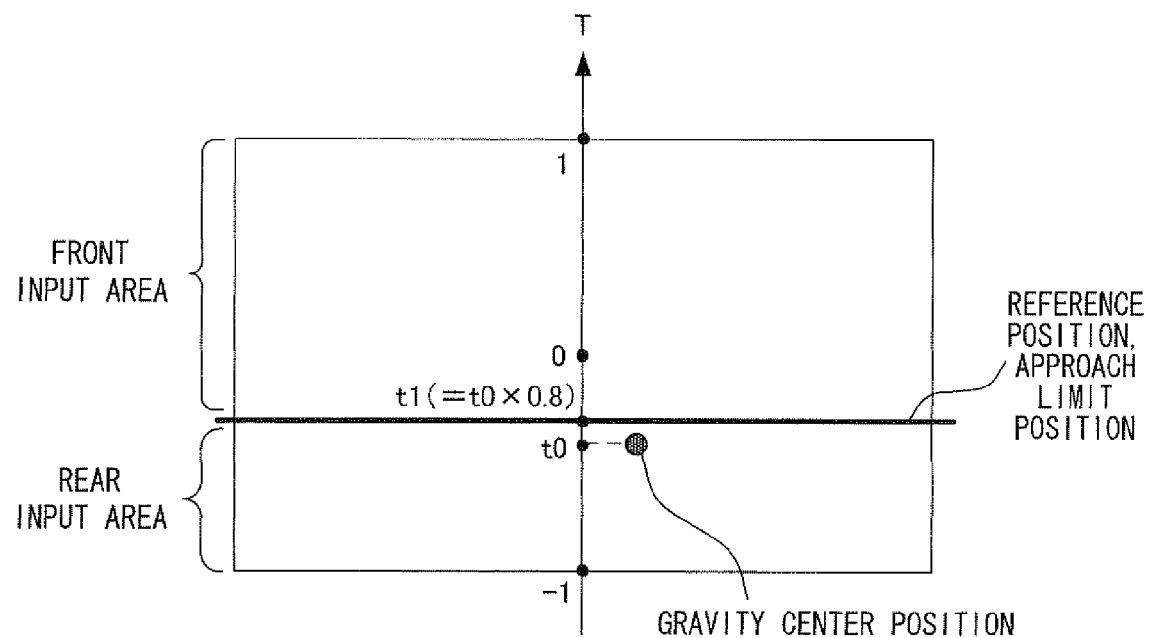
FIG. 31 is a view showing the method of updating the reference position during execution of the second video game.

When the gravity center position moves in the rear direction (in the T axis negative direction) from the state of FIG. 29 and enters the rear input area as shown in FIG. 30, the vehicle carrying the character in the virtual game space accelerates in the rearward direction, and the reference position is moved toward the gravity center position. In this case, the reference position is also controlled so as to approach the gravity center position with "a predetermined approach limit position as a limit". Specifically, as shown in FIG. 30, the position represented by the T coordinate value of t0*0.8 is set as the approach limit position, and the reference position is moved toward the approach limit position in a phased manner so as to gradually approach the approach limit position. Then, as shown in FIG. 31, the reference position finally reaches the approach limit position, and does not approaches the gravity center position anymore. Thus, the player can continuously accelerate the vehicle in the rearward direction at an acceleration of a magnitude in accordance with the distance between the gravity center position and the reference position (i.e. t0*0.2) at this time.

Figure 32:
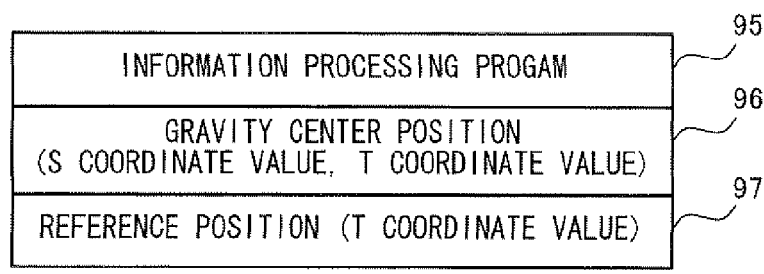
FIG. 32 shows a memory map of the external main memory during execution of the second video game.

FIG. 32 shows an example of a computer program and data that are stored in the external main memory 46 in the second example.

An information processing program 95 is a computer program that is composed of a plurality of program codes for causing the CPU 40 to execute the second video game.

A gravity center position 96 is two-dimensional coordinate data (s0, t0) indicative of the gravity center position of the player on the stand 36a of the load controller 36. It is noted that the gravity center position 96 is not necessarily two-dimensional coordinate data, and when only the T coordinate value of the gravity center position is used in the information processing program 95, only the T coordinate value may be stored as the gravity center position 96 in the external main memory 46.

A reference position 97 is data (t1) indicative of the T coordinate value of the reference position.

Figure 33:
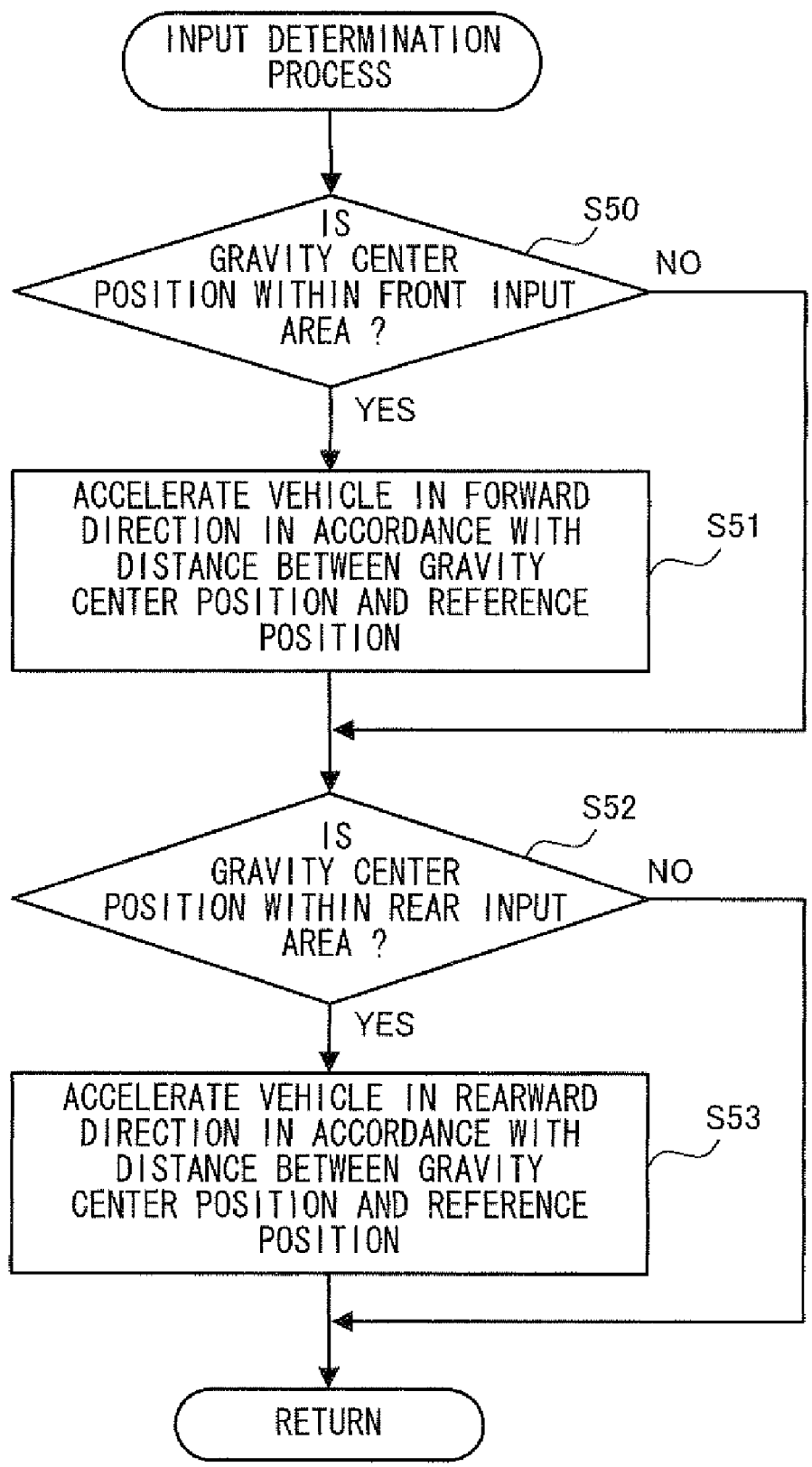
FIG. 33 is a flow chart showing in detail an input determination process during execution of the second video game.
Figure 34:
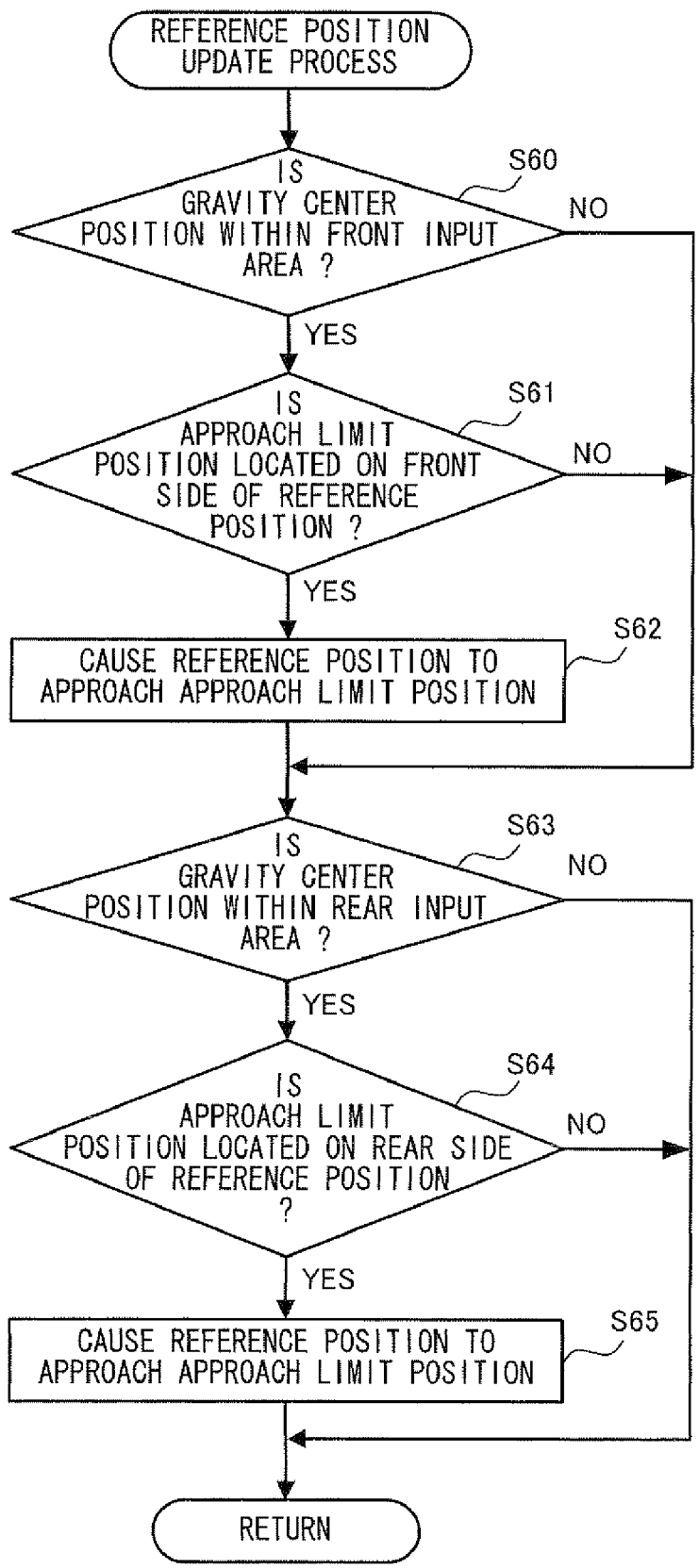
FIG. 34 is a flow chart showing in detail a reference position update process during execution of the second video game.

With reference to the flow charts in FIGS. 33 and 34, the following will describe a procedure of processing executed by the CPU 40 based on the information processing program 95. It is noted that the points in which the second example differs from the first example are only the input determination process at step S14 and the reference position update process at step S15 in the flow chart in FIG. 22. Thus, only an input determination process and a reference position update process in the second example will be described below.

First, the input determination process in the second example will be described in detail with reference to FIG. 33.

When the input determination process is started, at step S50, the CPU 40 refers to the gravity center position 96 and the reference position 97 that are stored in the external main memory 46, and determines whether or not the gravity center position is located within the front input area. Specifically, this determination is performed by comparing the magnitude of t0 with the magnitude of t1. When it is determined that the gravity center position is located within the front input area, the CPU 40 proceeds to step S51. When it is determined that the gravity center position is not located within the front input area, the CPU 40 proceeds to step S52.

At step S51, the CPU 40 accelerates the vehicle carrying the character in the virtual game space, in the forward direction at an acceleration of a magnitude in accordance with the distance between the gravity center position 96 and the reference position 97. It is noted that the acceleration direction at this time is set based on the orientation of the controller 22 held by the player.

At step S52, the CPU 40 refers to the gravity center position 96 and the reference position 97 that are stored in the external main memory 46, and determines whether or not the gravity center position is located within the rear input area. Specifically, this determination is performed by comparing the magnitude of t0 with the magnitude of t1. When it is determined that the gravity center position is located within the rear input area, the CPU 40 proceeds to step S53. When it is determined that the gravity center position is not located within the rear input area, the CPU 40 ends the input determination process.

At step S53, the CPU 40 accelerates the vehicle carrying the character in the virtual game space, in the rearward direction at an acceleration of a magnitude in accordance with the distance between the gravity center position 96 and the reference position 97. It is noted that the acceleration direction at this time is set based on the orientation of the controller 22 held by the player.

Next, the reference position update process in the second example will be described in detail with reference to FIG. 34.

When the reference position update process is started, at step S60, the CPU 40 refers to the gravity center position 96 and the reference position 97 that are stored in the external main memory 46, and determines whether or not the gravity center position is located within the front input area. Specifically, this determination is performed by comparing the magnitude of t0 with the magnitude of t. When it is determined that the gravity center position is located within the front input area, the CPU 40 proceeds to step S61. When it is determined that the gravity center position is not located within the front input area, the CPU 40 proceeds to step S63.

At step S61, the CPU 40 refers to the gravity center position 96 and the reference position 97 that are stored in the external main memory 46, and determines whether or not the approach limit position that is set in accordance with the gravity center position 96 is located on the front side (i.e. on the T axis positive direction side) of the reference position. Specifically, this determination is performed by comparing the magnitude of t0*0.8 with the magnitude of t1. When it is determined that the approach limit position is located on the front side of the reference position the CPU 40 proceeds to step S62. When it is determined that the approach limit position is not located on the front side of the reference position, the CPU 40 proceeds to step S63.

Figure 35:
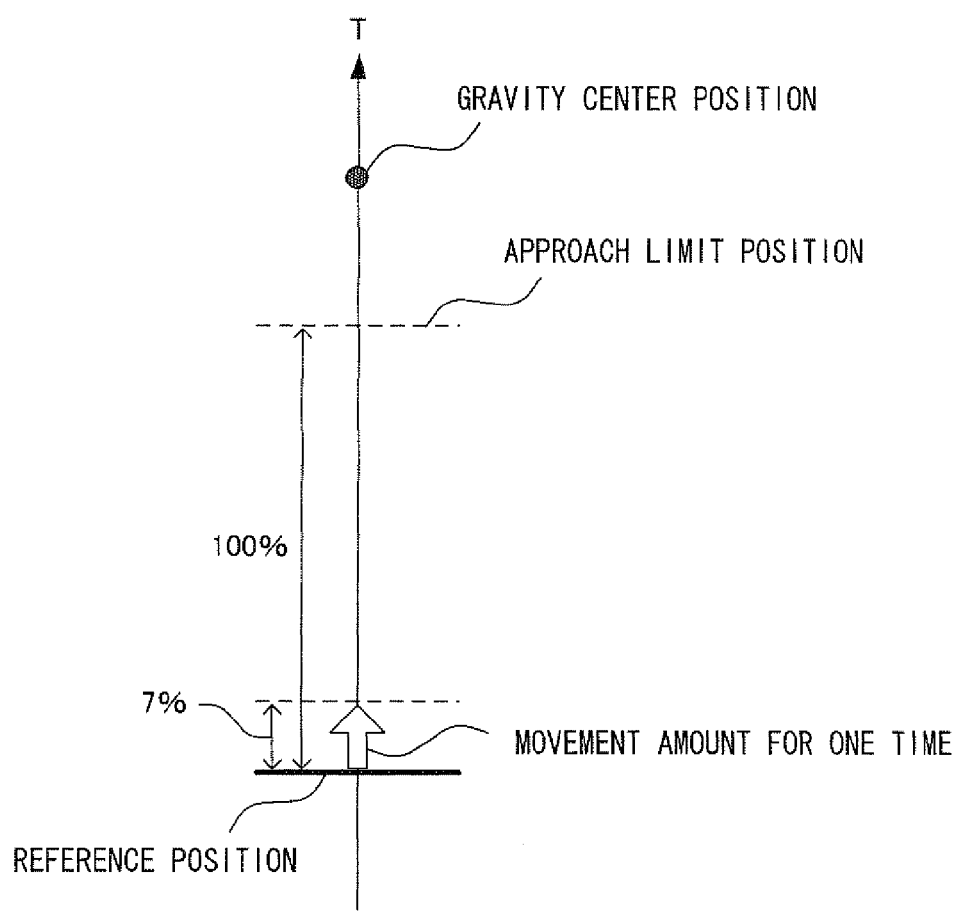
FIG. 35 is a view showing a movement amount of the reference position during execution of the second video game.

At step S62, the CPU 40 updates the reference position 97 stored in the external main memory 46, such that the reference position approaches the approach limit position. Specifically, as shown in FIG. 35, the reference position is caused to approach the approach limit position by the distance equivalent to 7% of the distance from the current reference position to the approach limit position. Thus, when the current reference position is represented by t1, an after-update reference position is represented by t1+((t0*0.8−t1)*0.07).

At step S63, the CPU 40 refers to the gravity center position 96 and the reference position 97 that are stored in the external main memory 46, and determines whether or not the gravity center position is located within the rear input area. Specifically, this determination is performed by comparing the magnitude of t0 with the magnitude of t1. When it is determined that the gravity center position is located within the rear input area, the CPU 40 proceeds to step S64. When it is determined that the gravity center position is not located within the rear input area, the CPU 40 ends the reference position update process.

At step S64, the CPU 40 refers to the gravity center position 96 and the reference position 97 that are stored in the external main memory 46, and determines whether or not the approach limit position that is set in accordance with the gravity center position 96 is located on the rear side (i.e. on the Taxis negative direction side) of the reference position. Specifically, this determination is perfumed by comparing the magnitude of t0*0.8 with the magnitude of t1. When it is determined that the approach limit position is located on the rear side of the reference position, the CPU 40 proceeds to step S65. When it is determined that the approach limit position is not located on the rear side of the reference position, the CPU 40 ends the reference position update process.

At step S65, the CPU 40 updates the reference position 97 stored in the external main memory 46, such that the reference position approaches the approach limit position. Specifically, the reference position is caused to approach the approach limit position by the distance equivalent to 7% of the distance from the current reference position to the approach limit position. Thus, when the current reference position is represented by t1, an after-update reference position is represented by t1−((t1−t0*0.8)*0.07).

By the processing executed by the CPU 40 as described above, the update process of the reference position as described with reference to FIGS. 27 to 31 is realized.

It is noted that the flow charts in FIGS. 33 and 34 are merely one example, and as long as the same result is obtained, the CPU 40 may be operated in accordance with a flow chart different from these flow charts.

Further, the aforementioned various constants ("0.8" in FIG. 28, "7%" in FIG. 35, and the like) are merely one example, and other values may be used according to need.

As described above, according to the above first example and second example, player's operational feeling can be improved because the reference position is updated based on the gravity center position.

Further, during playing of the first or second video game, even when the player unintentionally moves their gravity center position from the intended position (e.g. even when the player believes that the player performs steps at the center of the stand of the load controller but the gravity center position is actually unintentionally moved gradually rightward away from the center of the stand), the reference position can be sequentially updated to be a more appropriate position because the reference position is updated based on the sequentially detected gravity center position.

Further, even when there is a problem of eccentric positions of the gravity centers due to individual difference among players, or even when there is a problem of unintentional movement of the gravity center position of the player, the reference position can be updated so as to eliminate these problems because the reference position is updated so as to approach the gravity center position.

Further, responsiveness improves because the reference position is updated so as to approach the gravity center position. For example, in the first example, when the player causes the gravity center position to enter the left input area to cause the character to push down the left pedal after causing the gravity center position to enter the right input area to cause the character to push down the right pedal, a movement distance of the gravity center that is required for the player to cause the character to push down the left pedal after the character is caused to push down the right pedal, is shortened because the reference position approaches the gravity center position, and hence it is possible for the player to more quickly cause the character to push down the left pedal.

Further, particularly in the second example, because the reference position is updated so as to approach the gravity center position with a predetermined approach limit position as a limit, the reference position does not approach the gravity center position to reach the gravity center position, and the player can continuously input any one of a forward movement instruction for accelerating the vehicle in the forward direction and a rearward movement instruction for accelerating the vehicle in the rearward direction. In addition, because the approach limit position is set based on the gravity center position, the approach limit position can be adaptively set to an appropriate position.

Further, particularly in the first example, even when the player unintentionally moves their gravity center position from the intended position, for example, even when the player moves the controller 22, held by both hands, rightward away from their body and unintentionally moves their gravity center position rightward because the player attempts to turn the bicycle in the virtual game space in the right direction to the limit, the reference position can be sequentially updated to be a more appropriate position.

The embodiment of the present invention has been described above. However, the present invention is not limited to a video game, and is applicable to another arbitrary information processing system.

Further, the present embodiment has described the case of using the load controller 34 that is capable of two-dimensionally detecting a gravity center position. Instead of such a load controller 34, a gravity center position detection device that is capable of one-dimensionally detecting a gravity center position (i.e. detecting only a gravity center position in a particular one direction) may be used.

Further, the present embodiment has described the case of causing the reference position to gradually approach the gravity center position. However, the present invention is not limited thereto, and the reference position may be instantaneously moved to the gravity center position when a particular condition is satisfied (e.g. when the gravity center position enters the right area or the left area in FIG. 13).

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored thereon an information processing program that causes a computer of an information processing apparatus to perform functionality comprising:

detecting a gravity center position of a user based on a signal from a gravity center position detection device;

performing a predetermined process based on a relative position of the detected gravity center position with respect to a reference position or a reference area that is stored in a storage area; and updating, based on the detected gravity center position, the reference position or the reference area that is stored in the storage area.

2. The non-transitory computer-readable storage medium according to claim 1, wherein the reference position stored in the storage area is sequentially updated based on the detected gravity center position.

3. The non-transitory computer-readable storage medium according to claim 1, wherein the reference position stored in the storage area is updated so as to approach the detected gravity center position.

4. The non-transitory computer-readable storage medium according to claim 3, wherein the reference position stored in the storage area is updated in a phased manner so as to approach, in the phased manner, the detected gravity center position.

5. The non-transitory computer-readable storage medium according to claim 3, wherein the information processing program causes the computer of the information processing apparatus to further execute functionality comprising repeating a process of updating the reference position stored in the storage area, to be a position between the reference position and the detected gravity center position.

6. The non-transitory computer-readable storage medium according to claim 4, wherein the reference position stored in the storage area is updated so as to approach, at a predetermined rate, the detected gravity center position.

7. The non-transitory computer-readable storage medium according to claim 1, wherein the information processing program causes the computer of the information processing apparatus to further execute functionality comprising performing a first process when the detected gravity center position is distant from the reference position stored in the storage area, in a first direction for a constant distance or longer; and performing a second process when the detected gravity center position is distant from the reference position stored in the storage area, for the constant distance or longer in a second direction different from the first direction.

8. The non-transitory computer-readable storage medium according to claim 7, wherein the information processing program causes the computer of the information processing apparatus to further execute functionality comprising moving the reference position stored in the storage area, in the first direction when the detected gravity center position is distant from the reference position stored in the storage area, in the first direction for the constant distance or longer; and moving the reference position stored in the storage area, in the second direction when the detected gravity center position is distant from the reference position stored in the storage area, for the constant distance or longer in the second direction opposite to the first direction.

9. The non-transitory computer-readable storage medium according to claim 7, wherein the information processing program causes the computer of the information processing apparatus to further execute functionality comprising capability of executing only the second process out of the first process and the second process during a period after the first process is executed until the second process is executed; and capability of executing only the first process out of the first process and the second process during a period after the second process is executed until the first process is executed.

10. The non-transitory computer-readable storage medium according to claim 1, wherein the information processing program causes the computer of the information processing apparatus to further execute functionality comprising performing a first process in accordance with a distance between the gravity center position and the reference position when the detected gravity center position is located in a first direction with respect to the reference position stored in the storage area; and performing a second process in accordance with a distance between the gravity center position and the reference position when the detected gravity center position is located in a second direction different from the first direction, with respect to the reference position stored in the storage area.

11. The non-transitory computer-readable storage medium according to claim 10, wherein the information processing program causes the computer of the information processing apparatus to further execute functionality comprising moving the reference position stored in the storage area, in the first direction when the detected gravity center position is located in the first direction with respect to the reference position stored in the storage area; and moving the reference position stored in the storage area, in the second direction opposite to the first direction, when the detected gravity center position is located in the second direction with respect to the reference position stored in the storage area.

12. The non-transitory computer-readable storage medium according to claim 10, wherein the reference position stored in the storage area is updated so as to approach the detected gravity center position, with a predetermined approach limit position as a limit.

13. The non-transitory computer-readable storage medium according to claim 12, wherein the information processing program further causes the computer to execute functionality comprising setting the approach limit position based on the detected gravity center position.

14. The non-transitory computer-readable storage medium according to claim 1, wherein the information processing program further causes the computer to execute functionality comprising generating an image showing the detected gravity center position and the updated reference position, and outputting the image to a display device.

15. The non-transitory computer-readable storage medium according to claim 1, wherein
the information processing program further causes the computer to execute functionality comprising detecting, based on a signal from an operating device held by the user, movement of the operating device, and
performing the predetermined process based on both the detected relative position and the detected movement of the operating device.

16. The non-transitory computer-readable storage medium according to claim 1, wherein the information processing program causes the computer of the information processing apparatus to further execute functionality comprising:
determining in which of the reference area, a first area adjacent to the reference area, and a second area adjacent to the reference area and distant from the first area, the detected gravity center position of the user is located;
executing a first process in accordance with entry of the gravity center position into the first area;
executing a second process in accordance with entry of the gravity center position into the second area;

updating, in accordance with the entry of the gravity center position into the first area, a position of the reference area so as to approach the detected gravity center position; and updating, in accordance with the entry of the gravity center position into the second area, the position of the reference area so as to approach the detected gravity center position.

17. An information processing apparatus comprising:
a gravity center position detection unit for detecting a gravity center position of a user based on a signal from a gravity center position detection device;
a process unit for performing a predetermined process based on a relative position of the gravity center position, detected by the gravity center position detection unit with respect to a reference position or a reference area that is stored in a storage area; and
a reference position update unit for updating, based on the gravity center position detected by the gravity center position detection unit, the reference position or the reference area that is stored in the storage area.

18. The information processing apparatus according to claim 17, wherein
the gravity center position detection unit includes a determination unit for determining in which of the reference area, a first area adjacent to the reference area, and a second area adjacent to the reference area and distant from the first area, the gravity center position of the user detected based on the signal from the gravity center position detection device is located,
the process unit includes:
a first process unit for executing a first process in accordance with entry of the gravity center position into the first area; and
a second process unit for executing a second process in accordance with entry of the gravity center position into the second area, and
the reference position update means unit includes:
a first update unit for updating, in accordance with the entry of the gravity center position into the first area, a position of the reference area so as to approach the gravity center position detected by the gravity center position detection unit; and
a second update unit for updating, in accordance with the entry of the gravity center position into the second area, the position of the reference area so as to approach the gravity center position detected by the gravity center position detection unit.

19. An information processing system, comprising:
an input device capable of relaying information related to a load and gravity center information of a user; and
an information processing apparatus having one or more processors and associated with the input device, the information processing apparatus comprising:
a gravity center position detection unit for detecting a gravity center position of a user based on a signal from a gravity center position detection device,
a process unit for performing a predetermined process based on a relative position of the gravity center position, detected by the gravity center position detection unit, with respect to a reference position or a reference area that is stored in a storage area, and
a reference position update unit for updating, based on the gravity center position detected by the gravity center position detection unit, the reference position or the reference area that is stored in the storage area.

20. A method implemented in an information processing apparatus having one or more computer processors, the method comprising:
detecting a gravity center position of a user based on a signal from a gravity center position detection device;
performing, using one or more of the computer processors, a predetermined process based on a relative position of the detected gravity center position with respect to a reference position or a reference area that is stored in a storage area; and
updating, based on the detected gravity center position, the reference position or the reference area that is stored in the storage area.

* * * * *